(12) United States Patent
Hong et al.

(10) Patent No.: US 10,448,386 B2
(45) Date of Patent: Oct. 15, 2019

(54) METHOD AND APPARATUS FOR CONTROLLING REDUNDANT DATA TRANSMISSION

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/862,095

(22) Filed: Jan. 4, 2018

(65) Prior Publication Data
US 2018/0199315 A1   Jul. 12, 2018

(30) Foreign Application Priority Data

Jan. 6, 2017  (KR) .................. 10-2017-0002440
Dec. 12, 2017 (KR) .................. 10-2017-0169910

(51) Int. Cl.
*H04W 72/04* (2009.01)
*H04W 88/10* (2009.01)
(Continued)

(52) U.S. Cl.
CPC ......... *H04W 72/042* (2013.01); *H04L 1/1867* (2013.01); *H04L 5/00* (2013.01);
(Continued)

(58) Field of Classification Search
CPC combination set(s) only.
See application file for complete search history.

(56) References Cited

U.S. PATENT DOCUMENTS 10,368,266 B2 *  7/2019 Basu Mallick ... H04W 28/0278
2005/0169183 A1 * 8/2005 Lakkakorpi ............... H04L 1/22
                                                              370/238
(Continued)

FOREIGN PATENT DOCUMENTS

KR   10-2014-0102115 A   8/2014
KR   10-2015-0086171 A   7/2015

OTHER PUBLICATIONS

Huawei et al., "Support for ultra-reliable low latency communication (URLLC)", R2-166989, 3GPP TSG-RAN2 Meeting #95bis, Kaohsiung, Oct. 10-14, 2016, pp. 1-3.
(Continued)

*Primary Examiner* — Warner Wong
(74) *Attorney, Agent, or Firm* — IP Legal Services, LLC

(57) ABSTRACT

A method and apparatus for redundantly transmitting dual- or multi-connectivity based-data may be provided. In particular, the method of a user equipment configuring dual connectivity may be provided for redundantly transmitting data. The method may include receiving, from an base station, a radio resource control (RRC) message including configuration information for configuring redundant transmission in a packet data convergence protocol (PDCP) entity; configuring the redundant transmission in the PDCP entity for one or more radio bearers; receiving, from the base station, instruction information for instructing whether a redundant transmission operation of the configured PDCP entity is activated; and copying, when the instruction information instructs activation, a PDCP protocol data unit (PDU) in the PDCP entity and transmitting the copied PDCP PDU to different radio link control (RLC) entities to redundantly transmit the same data to a plurality of base stations.

17 Claims, 8 Drawing Sheets

(51) Int. Cl.
*H04L 1/18* (2006.01)
*H04W 48/10* (2009.01)
*H04L 5/00* (2006.01)
*H04W 76/15* (2018.01)
*H04L 1/08* (2006.01)
*H04W 36/00* (2009.01)
*H04W 88/06* (2009.01)

(52) U.S. Cl.
CPC ........... *H04W 48/10* (2013.01); *H04W 76/15* (2018.02); *H04W 88/10* (2013.01); *H04L 1/08* (2013.01); *H04L 1/189* (2013.01); *H04W 36/0069* (2018.08); *H04W 88/06* (2013.01); *Y02D 70/00* (2018.01); *Y02D 70/10* (2018.01); *Y02D 70/12* (2018.01); *Y02D 70/126* (2018.01); *Y02D 70/1262* (2018.01); *Y02D 70/1264* (2018.01); *Y02D 70/21* (2018.01)

(56) References Cited

U.S. PATENT DOCUMENTS

| | | | |
|---|---|---|---|
| 2005/0254448 A1* | 11/2005 | Tang | H04L 45/02 370/328 |
| 2007/0015528 A1* | 1/2007 | Nemethova | H04W 52/48 455/522 |
| 2015/0373559 A1 | 12/2015 | Hong | |
| 2016/0113058 A1* | 4/2016 | Jung | H04B 7/2612 370/328 |
| 2016/0255675 A1* | 9/2016 | Van Lieshout | H04L 1/1829 370/329 |
| 2016/0295440 A1* | 10/2016 | Lee | H04W 28/0278 |
| 2016/0337254 A1* | 11/2016 | Karaki | H04L 47/283 |
| 2016/0338132 A1* | 11/2016 | Uchino | H04W 28/08 |
| 2017/0026950 A1* | 1/2017 | Cao | H04W 88/10 |
| 2017/0222876 A1* | 8/2017 | Van Der Velde | H04W 36/0055 |
| 2017/0303170 A1* | 10/2017 | Uchino | H04W 16/32 |
| 2017/0311335 A1* | 10/2017 | Hayashi | H04W 16/32 |
| 2018/0220470 A1* | 8/2018 | Zacharias | H04W 76/15 |
| 2018/0279169 A1* | 9/2018 | Wang | H04L 1/1809 |
| 2018/0324641 A1* | 11/2018 | Tsai | H04L 69/321 |
| 2018/0367463 A1* | 12/2018 | Jose | H04L 47/32 |
| 2019/0053073 A1* | 2/2019 | Hayashi | H04W 16/32 |
| 2019/0159274 A1* | 5/2019 | Hong | H04W 28/02 |

OTHER PUBLICATIONS

3GPP, "3rd Generation Partnership Project; Technical Specification Group Radio Access Network; Study on Small Cell enhancements for E-UTRA and E-UTRAN—Higher layer aspects (Release 12)", 3GPP TR 36.842 V12.0.0, Dec. 29, 2013, pp. 1-71.

Huawei et al., "Support of Multi-Connectivity in NR", R2-167583, 3GPP TSG-RAN WG2 Meeting #96, Reno, USA, Nov. 14-18, 2016, pp. 1-5.

* cited by examiner

METHOD AND APPARATUS FOR CONTROLLING REDUNDANT DATA TRANSMISSION

CROSS REFERENCE TO RELATED APPLICATION

This application claims priority from Korean Patent Application Nos. 10-2017-0002440, filed on Jan. 6, 2017 and 10-2017-0169910, filed on Dec. 12, 2017 which are hereby incorporated by reference for all purposes as if fully set forth herein.

BACKGROUND OF THE INVENTION

1. Field of the Invention

The present disclosure relates to a method and apparatus for redundantly transmitting dual- or multi-connectivity-based data.

2. Description of the Prior Art

With the development of communication systems, consumers such as businesses and individuals now use a wide variety of wireless terminals.

In mobile communication systems such as the current 3GPP-based long term evolution (LTE), LTE-Advanced, 5G, and the like, there is a demand for a high-speed and large-capacity communication system capable of transmitting and receiving various data such as video, wireless data, etc., beyond voice-centric services. In addition, there are many studied for developing technologies for a next generation wireless access network for accommodating data transmission and reception of more terminals and providing higher QoS after LTE-Advanced. For example, a development work for a tentative 5G network centering on 3GPP is under way.

However, even if a next generation wireless access network technology is developed, a terminal and a base station using existing network technology will exist together, and the terminal will provide services using an existing network and a next generation network. In particular, in the case of a dual connectivity technology in which a terminal maintains connection with two or more base stations to provide services, it is necessary to provide services by employing the base station using different network technologies (radio access technology (RAT) etc.) according to the development of the next generation radio access network technology.

However, at present, there is no specific method and terminal operation defined for providing dual connectivity by empolying a base station using the existing network technology and a base station using the next generation network technology together.

In addition, there is a need to transmit data redundantly through a plurality of radio paths in order to reliably transmit and receive data with a low delay such as in ultra-reliable low latency communication (URLLC) services.

SUMMARY OF THE INVENTION

In this background, an aspect of the present disclosure is to provide a procedure and operation for a terminal to perform dual connectivity using a plurality of base stations.

Another aspect of the present disclosure is to provide a procedure and operation for redundantly transmitting, when a terminal and a base station configure a dual connection, data by utilizing the configured dual connection.

In accordance with an aspect of the present disclosure, there is provided a method in which data is redundantly transmitted by a user equipment (UE) where dual connectivity is configured, including: receiving, from an base station, a radio resource control (RRC) message including configuration information for configuring redundant transmission in a packet data convergence protocol (PDCP) entity; configuring the redundant transmission in the PDCP entity for one or more radio bearers; receiving, from the base station, instruction information instructing whether a redundant transmission operation of the configured PDCP entity is activated; and copying, when the instruction information instructs activation, a PDCP protocol data unit (PDU) in the PDCP entity and transmitting the copied PDCP PDU to different radio link control (RLC) entities to redundantly transmit the same data to a plurality of base stations.

In accordance with another aspect of the present disclosure, there is provided a method in which an base station configuring dual connectivity with a UE redundantly receives data, including: transmitting, to the UE, an RRC message including configuration information for configuring redundant transmission in a PDCP entity of the UE for one or more radio bearers; transmitting instruction information instructing whether a redundant transmission operation of the configured PDCP entity is activated; and redundantly receiving data copied in the PDCP entity of the UE and transmitted, through an RLC entity of the base station and an RLC entity of another base station configuring dual connectivity for the UE, when the instruction information instructs activation.

In accordance with still another aspect of the present disclosure, there is provided a UE in which dual connectivity redundantly transmitting data is configured, including: a receiver configured to receive, from an base station, an RRC message including configuration information for configuring redundant transmission in a PDCP entity and to receive instruction information instructing whether a redundant transmission operation of the PDCP entity configured from the base station is activated or deactivated; a controller configured to configure the redundant transmission of the PDCP entity for one or more radio bearers; and a transmission unit configured to copy, when the instruction information instructs activation, a PDCP PDU in the PDCP entity and transmit the copied PDCP PDU to different RLC entities to redundantly transmit the same data to a plurality of base stations.

In accordance with yet another aspect of the present disclosure, there is provided an base station that configures dual connectivity with a UE and redundantly receives data, including: a transmitter configured to transmit, to the UE, an RRC message including configuration information for configuring redundant transmission in a PDCP entity of the UE for one or more radio bearers and to transmit instruction information instructing whether a redundant transmission operation of the configured PDCP entity is activated or deactivated; and a receiver configured to redundantly receive, when the instruction information instructs activation, data copied in the PDCP entity of the UE and transmitted, through an RRC entity of the base station and an RLC entity of another base station configuring dual connectivity for the UE.

As described above, according to the present disclosure, a terminal may form dual connectivity using radio resources of a plurality of base stations, thereby rapidly transmitting and receiving a large amount of data.

Furthermore, the present disclosure may support redundant transmission of data while minimizing waste of radio resources in a dual connection environment, thereby supporting low-delay and high-reliability data transmission/reception services.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
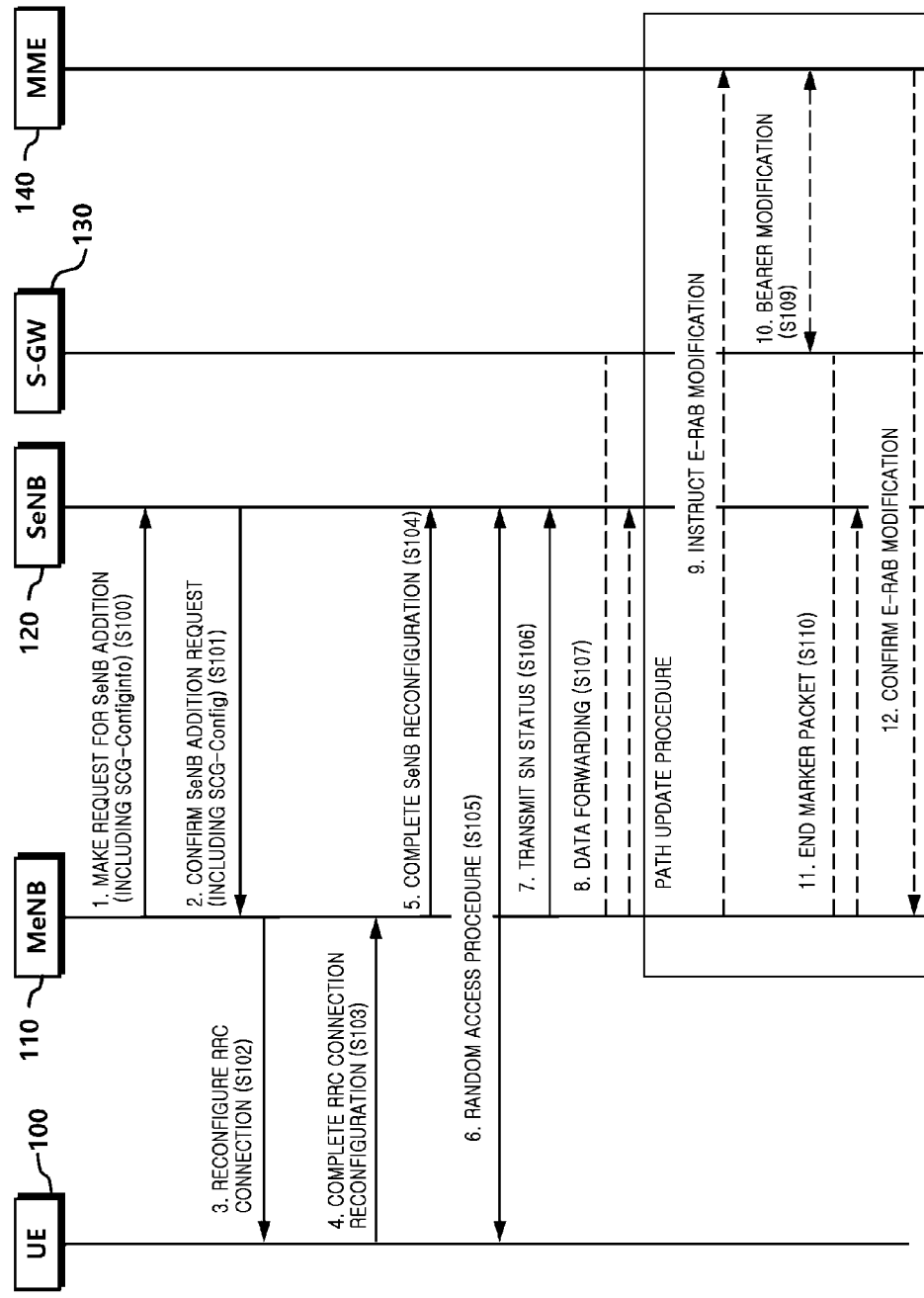
FIG. 1 is a diagram for explaining a secondary evolved Node-B (SeNB) addition procedure according to the related art.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specification, a wireless communication system refers to a system for providing various communication services such as voice service, packet data, and the like. The wireless communication system includes a user equipment (UE) and a base station (BS).

A UE may be an inclusive concept indicating a user terminal utilized in wireless communication, and it should be construed as a concept including all of a mobile station (MS), a user terminal (UT), a subscriber station (SS), a wireless device, and the like in GSM, as well as a user equipment (UE) in wideband code divition multiple access (WCDMA), long term evolution (LTE), high speed packet access (HSPA), international mobile telecommunication system (IMT)-2020 (5G or New Radio), and the like.

A BS or a cell may generally refer to a station that performs communication with a UE and may be construed as an inclusive concept including all of coverage areas such as a Node-B, an evolved Node-B (eNB), a gNode-B (gNB), a low power node (LPN), a sector, a site, various types of antennas, a base transceiver system (BTS), an access point, a point (e.g., a transmission point, a reception point, or a transmission/reception point), a relay node, a mega cell, a macrocell, a microcell, a picocell, a femtocell, a remote radio head (RRH), a radio unit (RU), a small cell, and the like.

Each of the above-mentioned various cells has a BS that controls a corresponding cell, and thus, the BS may be construed in two ways: i) the BS may be a device itself that provides a megacell, a macrocell, a microcell, a picocell, a femtocell, and a small cell in association with a wireless area; or ii) the BS may indicate a wireless area itself. In i), all devices that interact with one another to enable the devices that provide a predetermined wireless area to be controlled by an identical entity or to cooperatively configure the wireless area, may be indicated as a BS. Based on a configuration type of a wireless area, a point, a transmission/reception point, a transmission point, a reception point, and the like may be embodiments of a BS. In ii), a wireless area itself that receives or transmits a signal from a perspective of a UE or that of a neighboring BS, may be indicated as a BS.

In this specification, a cell refers to a coverage of a signal transmitted from a transmission/reception point, a component carrier having the coverage of the signal transmitted from the transmission/reception point (or transmission point), or the transmission/reception point itself.

In this specification, the UE and the BS are used as two inclusive (uplink or downlink) transceiving subjects to embody the technique and technical concept described in the specification, and may not be limited to a predetermined term or word.

Here, uplink (UL) refers to a scheme for a UE to transmit/receive data to/from a BS, and Downlink (DL) refers to a scheme for a BS to transmit/receive data to/from a UE.

UL transmission and DL transmission may be performed based on a time division duplex (TDD) scheme that performs transmission based on different times, based on a frequency division duplex (FDD) scheme that performs transmission based on different frequencies, or based on a mixed scheme of TDD scheme and FDD scheme.

Further, in a wireless communication system, a standard may be developed by configuring an UL and a DL based on a single carrier or a pair of carriers.

The UL and the DL may transmit control information through a control channel, such as a physical downlink control channel (PDCCH), a physical uplink control channel (PUCCH), or the like, and may be configured as a data channel, such as a physical downlink shared channel (PDSCH), a physical uplink shared channel (PUSCH), or the like, so as to transmit data.

A DL may refer to a communication or communication path from a multi-transmission/reception point to a UE, and an UL may refer to a communication or communication path from a UE to a multi-transmission/reception point. In a DL, a transmitter may be a part of a multi-transmission/reception point and a receiver may be a part of a UE. In a UL, a transmitter may be a part of a UE and a receiver may be a part of a multi-transmission/reception point.

Hereinafter, the situation in which a signal is transmitted/received through a channel such as a PUCCH, a PUSCH, a PDCCH, a PDSCH, or the like may be described through the expression, "a PUCCH, a PUSCH, a PDCCH, or a PDSCH is transmitted/received".

Meanwhile, high layer signaling described below includes radio resource control (RRC) signaling for transmitting RRC information including RRC parameters.

A BS performs DL transmission to UEs. The BS may transmit DL control information such as scheduling necessary for reception of a DL data channel which is a main physical channel for unicast transmission, and a physical DL control channel for transmitting scheduling approval information for transmission in an UL data channel. Hereinafter, the transmission and reception of a signal through each channel will be described as transmission and reception of a corresponding channel.

There is no restriction on multiple access schemes applied in wireless communication systems. That is, various multiple access schemes such as time division multiple access (TDMA), frequency division multiple access (FDMA), code division multiple access (CDMA), orthogonal frequency division multiple access (OFDMA), non-orthogonal multiple access (NOMA), OFDM-TDMA, OFDM-FDMA, and OFDM-CDMA may be used. Here, the NOMA includes sparse code multiple access (SCMA), low density spreading (LDS), and the like.

One embodiment of the present disclosure may be applied to resource allocation such as an asynchronous wireless communication field that evolves into an LTE/LTE-Advanced and IMT-2020 via GSM, WCDMA, and HSPA, a synchronous wireless communication field that evolves into CDMA, CDMA-2000, and UMB, and the like.

In the present specification, a machine type communication (MTC) UE may refer to a UE that supports low cost (or low complexity), a UE that supports coverage enhancement, or the like. Alternatively, in the present specification, the MTC UE may refer to a UE defined in a specific category for supporting low cost (or low complexity) and/or coverage enhancement.

In other words, in the present specification, the MTC UE may refer to a newly defined 3GPP Release-13 low cost (or low complexity) UE category/type for performing LTE-based MTC-related operations. Alternatively, in the present specification, the MTC UE may refer to a category/type defined under an existing 3GPP Released-12 that supports enhanced coverage compared to existing LTE coverage or supports low power consumption, or may refer to a newly defined Release-13 low cost (or low complexity) UE category/type. Alternatively, the MTC UE may refer to a further enhancement MTC UE defined in Release-14.

In the present specification, a narrowband Internet of things (NB-IoT) UE may refer to a UE that supports wireless access for celluar IoT. Objectives of the NB-IoT technology include improved indoor coverage, support for large-scale low-speed terminals, low latency sensitivity, low cost terminal costs, low power consumption, and optimized network structure.

As typical usage scenarios in new radio (NR) under discussion in 3GPP, enhanced mobile broadband (eMBB), massive machine type communication (mMTC), and ultra reliable and low latency communication (URLLC) have been proposed.

In the present specification, a frequency, a frame, a subframe, a resource, a resource block, a region, a band, a subband, a control channel, a data channel, a synchronization signal, various reference signals, various signals, and various messages which are in association with NR can be interpreted in the past or in the presently used meaning or in various meanings used in the future.

In the present specification, a dual connection means a technology in which a UE may establish a wireless connection with a plurality of BSs to transmit or receive data, and may be referred to as dual connectivity, multi-connectivity, or the like. However, the term "dual connection" or "dual connectivity" is used for convenience of explanation, and there is no limitation to the term.

LTE Dual Connectivity Operation

Typical LTE technology supports a dual connectivity technology for a UE to simultaneously use two BS radio resources. For multiple RX/DC UEs in an RRC connected state, an dual connectivity operation is configured to utilize radio resources provided by two different schedulers which are located to be connected to two BSs connected through a non-ideal backhaul.

In dual connectivity, a UE may provide services through two base stations. For example, a UE may perform communication using a master evolved Node-B (MeNB) and a secondary eNB (SeNB). The MeNB may refer to a BS that provides an RRC connection to a UE and is a reference for handover, and the SeNB may refer to a BS that provdies additional radio resources to a UE.

To provide SeNB radio resources to a UE, an SeNB addition procedure for setting UE context to the SeNB is used.

FIG. 1 is a diagram for explaining an SeNB addition procedure according to the related art.

Each operation will be described with reference to FIG. 1.

1. In operation S100, a MeNB 110 makes a request for radio resource allocation for indicating characteristics for specific E-RAB, from a SeNB 120. In addition, the MeNB 110 uses MCG configuration (including security algorithm for SCG bearer) within SCG-ConfigInfo and the entire UE capabilities for UE capability coordination, as a basis to for reconfiguration by the SeNB 120, but does not include SCG configuration. The MeNB 110 can provide the latest measurement results for SCG cell(s) requested to be added. The SeNB 120 may reject the request.

2. In operation S101, when an RRM entity in the SeNB 120 is able to admit the resource request, it allocates respective radio resources and allocates respective transport network resources depending on a bearer option. The SeNB 120 may trigger random access (RA) so that synchronisation of radio resoruce configuration of the SeNB 120 can be performed. The SeNB 120 provides new radio resources of SCG in SCG-Config to the MeNB 110. X2 DL TNL address information about split bearers may be provided together with S1 DL TNL address information about each E-RAB and security algorithm for SCG bearers.

3. In operation S102, when the MeNB 110 endorses the new configuration, the MeNB 110 sends an RRCConnectionReconfiguration message including the new radio resource configuration of SCG to the UE according to the SCG-Config.

4. In operation S103, the UE applies the new configuration and replies with RRCConnectionReconfigurationComplete message. When the UE fails to apply (part of) the configuration included in the RRCConnectionReconfiguration message, it performs a reconfiguration failure procedure.

5. In operation S104, the MeNB 110 informs the SeNB 120 that the UE 100 has completed the reconfiguration procedure successfully.

6. In operation S105, the UE 100 performs synchronisation with respect to the PSCell of the SeNB 120. The order in which the UE sends the RRCConnectionReconfiguration-Complete message and performs an RA procedure with respect to the SCG is not defined. The successful RA procedure for the SCG is not required for a successful completion of an RRC connection reconfiguration procedure.

7 and 8. In operations S106 and S107, in the case of the SCG bearers, the MeNB 110 may take actions to minimise service interruption due to activation of dual connectivity (data forwarding or SN status transfer), depending on bearer characteristics of each E-RAB.

9 to 12. In operations S108 to S111, in the case of the SCG bearers, update of a UP path towards EPC is performed.

In operation S102, when the MeNB 110 sends an RRC connection reconfiguration message including a new radio resource configuration of a secondary cell group, the UE 100 applies a new configuration as in operation S103. When the UE 100 cannot comply with (part of) the configuration included in the RRC connection reconfiguration message, the UE 100 performs the reconfiguration failure procedure.

In the typical LTE dual connectivity technology provided based on coordination between two LTE base stations, the MeNB 110 understands a radio resource control (RRC) message of the SeNB 120. Considering the coordination between the UE capabilities and the SeNB 120, the MeNB 110 may generate a final RRC message and may instruct the UE 100 to efficiently utilize the radio resources of the two base stations. The RRC message may be provided only through the radio interface between the UE 100 and the MeNB 110.

New Radio (NR)

3GPP is conducting research on next generation/5G (hereinafter, referred to as "NR" for convenience of explanation) radio access technology. As a requirement for architecture and migration for the NR radio access technolgy, an RAN architecture needs to support tight interworking between NR and LTE radio access technology. In addition, dual connectivity technology may be used between NR base stations in the NR radio access technology. The dual connectivity in a NR environment may be defined as multi-connectivity. For example, the multi-connectivity may be defined as an operating mode of a UE for utilizing radio resources configured by an LTE base station and/or a NR base station.

The NR radio access technology may be established even at high frequencies (e.g., a high frequency of about 6 GHz or more). In this case, fast SINR drops may occur depending on the link blockage and high transmission loss in a high frequency band. This may cause unnecessary delay or a reduction reliability when a NR base station attempts to send a control plane RRC message or user plane data through an interface between a NR and a UE. In particular, such a problem makes it difficult to provide services such as ultra-reliable low latency Communications (URLLC). As an example for solving such a problem, it is possible to make the control plane RRC message redundantly transmitted via one or more radio paths by adopting RRC diversity technology. As another example for solving such a problem, it is possible to make the user plane data redundantly transmitted via one or more radio paths based on the multi-connectivity.

However, the redundant transmission has a problem of consuming additional radio resources. In other words, redundant transmission via two or more radio paths may be considered as a method for reliably providing a service such as URLLC in a radio access network with low delay. However, the redundant transmission via two radio paths consumes additional radio resources in transmitting the same data.

It is an object of the present disclosure, which has been devised to solve such problems, to provide a redundant transmission processing method and apparatus capable of efficiently processing a service such as URLLC.

Embodiments described below can be applied not only to a next generation mobile communication (5G mobile communication/NR) UE but also to an arbitrary radio access network UE.

For convenience of description, an base station may represent an LTE/E-UTRAN eNodeB or an LTE base station, or may represent a NR node, a central unit (CU) or a distribute unit (DU) in a 5G wireless network in which a CU and a DU are separated, a gNodeB in which a CU and a DU are implemented as a single logical entity, a NR base station (CU, DU, or entity in which a CU and a DU are implemented as a single logical entity, hereinafter, referred to as "NR base station" for convenience of description, but all of the above-described entities may be included in the scope of the present disclosure), and the like. Therefore, in the following description, an eNB, a NR base station, an LTE base station, and the like are described as necessary, and the NR base station and the LTE base station are classified according to radio access technologies. However, these terms are for the convenience of description and division, and there is no restriction on the terms.

In the present specification, in order to describe a method for configuring dual connectivity between an LTE base station and a NR base station using different radio access technologies, the LTE base station is described as a master eNB (MeNB) and the NR base station is described as a secondary eNB (SeNB). However, the present disclosure can be applied to dual connectivity between LTE base stations, and thus, even when the SeNB is an LTE base station, the present disclosure can be applied in the same manner. Similarly, the present disclosure can be applied even when the NR base station is a MeNB and the LTE base station is a SeNB, and can also be applied to dual connectivity between LTE base stations.

Thus, in the following description, the LTE base station and the NR base station are separately described. When it is necessary to describe the operation according to dual connectivity in detail, the LTE base station is described as a MeNB and the NR base station is referred to as a SeNB. The name of each base station is for convenience of understanding, and thus the LTE base station may refer to an eNB and the NR base station may refer to a gNB. That is, in the present disclosure, base stations using different radio access technologies are discriminated from each other, and terms therof are not limited.

A core network connection in dual connectivity for NR may be considered in the following scenarios.

When NR is integrated in LTE and connected via EPC, a control plane may be connected between an LTE base station and an EPC entity (MME), and a user plane may be separated from a core network or a radio network.

When multiple NR base stations are aggregated and connected through NG-core (5G core network), a control plane may be connected between the NR base station and an NG-Core control plane entity, and a user plane may be separated from a core network or a radio network.

When LTE is integrated in NR and connected via NG-core (5G core network), a control plane may be connected between a NR base station and an NG-core control plane entity, and a user plane may be separated from a core network or a radio network.

When NR is integrated in LTE and connected through NG-core (5G core network), a control plane may be connected between an LTE base station and a NG-core control plane entity, and a user plane may be separated from a core network or a radio network.

As dual- or multi-connectivity for NR (hereinafter, referred to as "dual connectivity" for convenience of description, and providing two connectivity or more is also included in the scope of the present disclosure), the following three cases may be considered.

LTE (Master Node)—NR (Secondary Node)
NR (Master Node)—NR (Secondary Node)
NR (Master Node)—LTE (Secondary Node)

As dual/multi-connectivity for NR, the following cases can be considered.

intra frequency dual/multi-connectivity
inter frequency dual/multi-connectivity

A NR base station may perform one or more control functions of NR cell (cell group, transmission point, transmission point group, transmission/reception point, transmission/reception point group, TRP, antenna, antenna group, or beam, hereinafter referred to as "cell") addition (modification, release, or management), NR measurement, NR measurement reporting, NR resource allocation, NR radio bearer addition/correction/release, NR radio resource configuration, and NR mobility control. The NR base station may instruct a UE to perform the above-described one or more control functions via an RRC configuration or reconfiguration message.

For example, an LTE RRC entity of the LTE base station and a NR RRC entity of the NR base station may independently instruct a corresponding base station radio resource control configuration. For another example, the LTE RRC entity of the LTE base station may independently instruct corresponding base station radio resource control configuration via an interface between an LTE and a UE, and the NR RRC entity of the NR base station may independently instruct a corresponding base station radio resource control configuration via an interface between a NR and a UE. For another example, the LTE RRC entity of the LTE base station and the NR RRC entity of the NR base station may independently instruct a corresponding base station radio resource control to configuration within a range not exceeding UE capability. For still another example, the LTE RRC entity of the LTE base station and the NR RRC entity of the NR base station may instruct corresponding base station radio resource control configuration through coordination. For yet another example, the LTE RRC entity of the LTE base station may instruct LTE base station radio resource control configuration via an LTE radio link and a NR radio link. For yet another example, the NR RRC entity of the NR base station may instruct the LTE base station radio resource control configuration via the NR radio link and the LTE radio link.

Specific methods for transmitting the above-described radio resource control signaling will be described later.

A UE and an base station may redundantly transmit data using dual connectivity configured in the UE in order to transmit low-latency and high-reliability data. That is, the UE may redundantly transmit uplink data through two base stations, and the base station may redundantly transmit downlink data using another base station that configures dual connectivity in the UE. However, when all the data are redundantly transmitted using a plurality of radio paths, limited radio resources are wasted. Accordingly, in the present disclosure, an embodiment of redundantly transmitting data is proposed to provide a low-latency and high-reliability service while minimizing the waste of limited radio resources.

For example, on a dual connectivity-based handover, a MeNB (or a SeNB) may instruct an RRC signaling message to be transmitted via a plurality of paths through a signaling radio bearer configured between two base stations and a UE.

For another example, a MeNB (or a SeNB) may instruct a UE configured by dual connectivity to transmit user plane data via a plurality of paths through a DRB configured between two base stations and the UE.

For still another example, a MeNB (or a SeNB) may instruct a UE configured with dual connectivity to transmit user plane data via a signel path through data on a data radio bearer configured between two base stations and a UE. At this time, a condition for switching a specific single path between redundant transmission and single path transmission or for switching a specific signal path within multiple paths may be instructed. For example, the corresponding condition may be an uplink data separation threshold value. In a case in which the redundant data transmission is configured but is deactivated or the redundant data transmission is configured and is activated, when available PDCP data volume and RLC data volume associated with two RLC entities are less than the corresponding condition, the PDCP data may be transmitted to the configured single path RLC entity.

Additional radio resources are consumed by redundantly transmitting the RRC signaling message or the user plane data on a plurality of radio interfaces. However, through this, it is possible to improve the reliability of the transmission of the control plane message or the transmission of the user plane data. Also, when the SeNB transmits the RRC message directly to the UE via the radio interface, data may be transmitted quickly without delay of a backhaul interval between the base stations.

As described above, the multi-path redundant transmission method improves the reliability but causes the radio resources to be consumed due to complexity and redundant transmission. Hereinafter, description will be made based on the redundant transmission of the RRC message. This is merely for convenience of description, and the redundant transmission of the user plane data can be equally provided. Therefore, the redundant transmission of the user plane data is also included in the scope of the present embodiment. For example, the redundant transmission of the user plane data may be processed in a PDCP entity of a separate radio bearer that processes the control plane data and the user plane data for each control plane data or user plane data.

Meanwhile, in the following description, a case in which a UE transmits uplink data will be mainly described, but the same procedure can also be applied when an base station transmits downlink data. In the present specification, the dual connectivity is described as being applied to each case in which the dual connectivity is configured by a plurality of base stations using NR-NR, NR-LTE, or LTE-NR radio access technology. Also, the dual connectivity should be interpreted to include the meaning of multi-connectivity.

Hereinafater, operations of a UE and an base station for redundant data transmission according to an embodiment will be described with reference to FIG. 2 and FIG. 3, and more specific embodiments will be described later.

Figure 2:
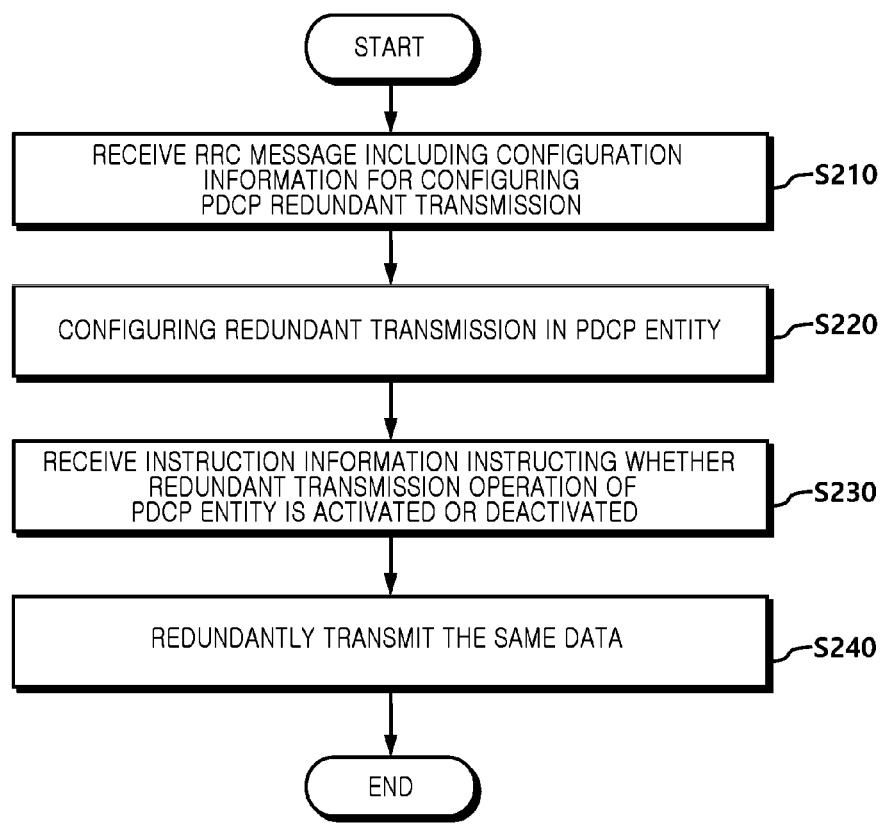
FIG. 2 is a diagram for explaining the operation of a user equipment (UE) according to an embodiment.

FIG. 2 is a diagram for explaining operations of a UE according to an embodiment.

Referring to FIG. 2, in operation S210, a UE according to an embodiment may perform an operation of receiving an RRC message including configuration information for configuring redundant transmission in a packet data convergence protocol (PDCP) entity from an base station. The UE may form a dual connection (dual connectivity) with a plurality of base stations. The plurality of base stations may be configured to use different radio access technologies. For example, a master eNB (MeNB) may be a gNB using the above-described NR radio access technology, and a secondary eNB (SeNB) may be an base station using the LTE radio access technology. Alternatively, the MeNB may be an base station using the LTE radio access technology, and the SeNB may be a gNB using the NR radio access technology. Alternatively, both the MeNB and the SeNB may be gNBs using the NR radio access technology. The dual connectivity may be configured in the UE by the base station, and the UE may transmit and receive data to and from each of the plurality of base stations using configured radio resources.

The UE in which the above-described dual connectivity is configured may enable the PDCP entity to receive the RRC message including configuration information for configuring redundant transmission from the base station. The configuration information may include information for supporting a redundant transmission function in the PDCP entity. For example, the configuration information may include information for configuring the UE so that at least one operation of i) a processing operation when redundant data is received from the PDCP entity, ii) a processing operation when information about whether the redundant transmission function is activated or deactivated is received, iii) an operation in which the PDCP entity transmits data having the same PDCP SN via two paths, and iv) an operation of instructing two RLC entity configuration in association with the PDCP entity can be performed.

In operation S220, the UE may perform an operation of configuring redundant transmission in the PDCP entity for one or more radio bearers. For example, the UE may configure the redundant transmission in such a manner that the PDCP entity may transmit the data having the same PDCP SN via a plurality of paths based on the configuration information. The UE may configure the redundant transmission to be deactivated while configuring the redundant transmission in the PDCP entity. Alternatively, the UE may configure the redundant transmission in the PDCP entity to be activated. The UE may configure the two RLC entities associated with the PDCP entity in which PDCP redundant transmission is configured.

Next, in operation S230, the UE may perform an operation of receiving, from the base station, instruction information instructing whether the redundant transmission operation of the configured PDCP entity is activated. For example, the instruction information may be received via a medium access control control element (MAC CE). The instruction information may include information instructing whether the redundant transmission function of the PDCP entity for the radio bearer to perform PDCP redundant transmission configured in the UE is changed to be activated or deactivated. When the instruction information instructs activation of the redundant transmission function for a specific radio bearer to perform PDCP redundant transmission, an MAC entity of the UE may instruct an upper layer to activate the redundant transmission operation of the PDCP entity for the specific radio bearer. That is, when the instruction information received through the MAC CE instructs the activation of the redundant transmission function, the MAC entity of the UE may transmit the instruction information to the upper layer (for example, an RRC layer or a PDCP layer) and may instruct the upper layer to activate the redundant transmission function.

In operation S240, when the instruction information instructs the activation, the UE may copy a PDCP protocol data unit (PDU) from the PDCP entity, and the UE may transmit the copied PDCP PDU to different radio link control (RLC) entities, thereby redundantly transmitting the same data to the plurality of base stations. For example, when the redundant transmission function of the PDCP entity for the specific radio bearer to perform the PDCP redundant transmission configured in the UE is configured (or changed) to be activated by the instruction information, the PDCP entity for the corresponding specific radio bearer may copy data to be transmitted to the base station, and the PDCP entity may transmit the copied data to a plurality of RLC entities connected to the PDCP entity for the specific radio bearer to perform the PDCP redundant transmission, thereby transmitting the same data to the base station via a plurality of radio paths.

Meanwhile, the plurality of RLC entities may be configured in the UE for each to base station forming the dual connectivity, and the plurality of RLC entities may be associated with one PDCP entity. The plurality of RLC entities may be associated with the corresponding single PDCP entity through a radio bearer identifier or a logical channel identifier. Accordingly, when the PDCP entity transmits the same data to the plurality of RLC entities with which the PDCP entity is associated, each base station may receive the same data. Here, the MeNB may receive data through the radio resource between the MeNB and the UE and may also receive the same data from the SeNB, thereby redundantly receiving the data transmitted by the UE. In this case, the PDCP entity of the base station may remove any one of redundantly received data packets and may transmit the corresponding data to the upper layer. For example, the PDCP entity of the base station may first transmit the received data packet to the upper layer and then may remove the data packet having the same SN received thereafter.

When the instruction information for the activation of the PDCP redundant transmission instructs deactivation of the redundant transmission function for the corresponding radio bearer and the redundant transmission operation for the corresponding radio bearer is configured in the UE, the PDCP entity may transmit the PDCP PDU to any one of the plurality of RLC entities. That is, when the redundant transmission function of the PDCP entity for the specific radio bearer to perform PDCP redundancy transmission is configured in the UE but the corresponding function is deactivated, the PDCP entity may transmit corresponding data to any one of the plurality of RLC entities configured for dual connectivity, thereby performing data transmission via a single path. This may be an RLC entity configured by default for the corresponding radio bearer. The RLC entity may be used for convenience of explanation as described above, and the RLC entity may have various names such as a configured RLC entity, a primary RLC entity, a default RLC entity, a first configured RLC entity, and the like, and to there is no limitation in the names.

In addition, the redundant transmission function described above may be configured only for a data radio bearer (DRB). For example, the redundant transmission function in the PDCP entity may not be configured for the signaling radio bearer, but may be configured only for the DRB.

In addition, the instruction information may instruct each of one or more DRBs to activate or deactivate the redundant transmission operation of the PDCP entity. For example, the instruction information may include information on whether the redundant transmission function of the PDCP entity is activated or deactivated for each DRB configured in the UE. In this case, the PDCP redundant transmission function may be instructed to be activated for the specific DRB, but may be instructed to be deactivated for another DRB. In order to instruct whether the redundant transmission operation of the corresponding PDCP entity is activated or deactivated for each of the one or more DRBs, the instruction information provided through the MAC CE may include bitmap information for instructing an activation/deactivation state for each radio bearer corresponding to each radio bearer identifier.

The above-described base station may be a MeNB or a SeNB.

Thus, in accorance with at least one emodiemnt, it may determine whether the redundant transmission is performed for each DRB, thereby minimizing radio resource waste and data processing time loss due to the redundant transmission. In addition, the redundant transmission function may be configured in the UE, and it may dynamically control whether the redundant transmission function is activated or deactivaed through the MAC CE, thereby providing a dynamic management effect for radio resources.

Figure 3:
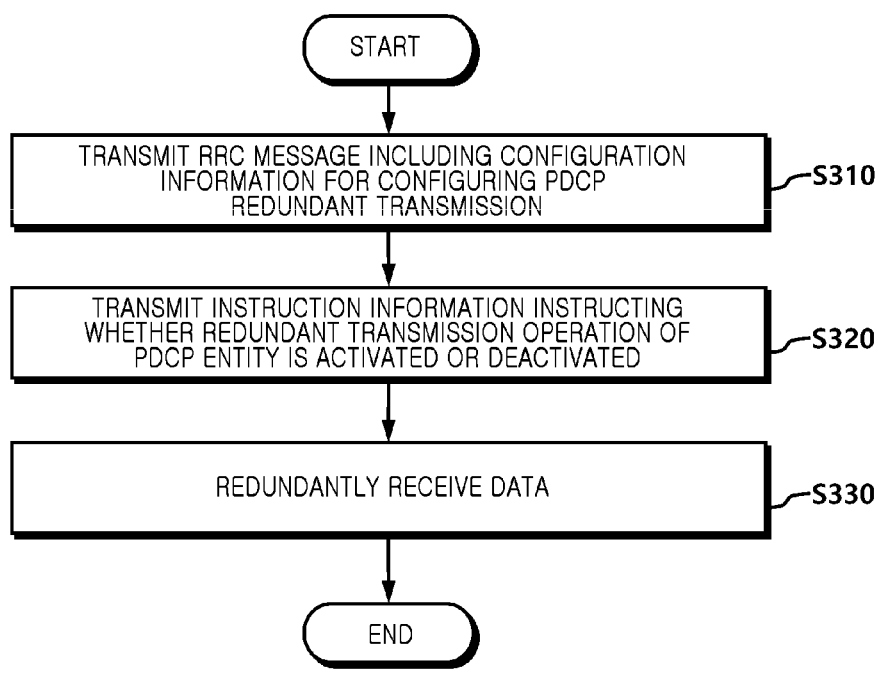
FIG. 3 is a diagram for explaining the operation of an base station according to an embodiment.

FIG. 3 is a diagram for explaining operations of an base station according to an embodiment.

Referring to FIG. 3, in operation S310, an base station according to an embodiment may perform an operation of transmitting an RRC message including configuration information for configuring redundant transmission in a PDCP entity of a UE for one or more radio bearers, to the UE. The base station may form dual connectivity in the UE together with other base stations. As described above, the base stations forming dual connectivity may be configured to use different radio access technologies. For example, a MeNB may be a gNB using the above-described NR radio access technology, and a SeNB may be an base station using the LTE radio access technology. Alternatively, the MeNB may be an base station using the LTE radio access technology, and the SeNB may be a gNB using the NR radio access technology. Alternatively, both the MeNB and the SeNB may be gNBs using the NR radio access technology. In addition, in FIG. 3, the base station may be a MeNB or a SeNB.

Meanwhile, the base station may transmit an RRC message including configuration information for configuring redundant transmission of a PDCP entity of a UE for one or more radio bearers, to the UE. For example, the configuration information may include information for supporting a redundant transmission function in the PDCP entity. By way of example, the configuration information may include information for configuring the UE so that at least one operation of i) a processing operation when redundant data is received from the PDCP entity of the UE, ii) a processing operation when information about whether the redundant transmission function is activated or deactivated is received, iii) an operation in which the PDCP entity of the UE transmits data having the same PDCP SN via two paths, and iv) an operation of instructing two RLC entity configuration in association with the PDCP entity can be performed.

The UE may configure the redundant transmission in the PDCP entity for one or more radio bearers based on the configuration information. For example, the UE may configure data having the same PDCP SN in the PDCP entity via a plurality of paths based on the configuration information. The UE may configure two RLC entities associated with the PDCP entity in which PDCP redundancy transmission is configured.

Next, in operation S320, the base station may transmit instruction information instructing whether a redundant transmission operation of the configured PDCP entity is activated or deactivated. For example, the instruction information may be transmitted through an MAC CE. The instruction information may include information instructing whether the redundant transmission function of the PDCP entity for the radio bearer to perform PDCP redundant transmission configured in the UE is changed to be activated or deactivated.

In operation S330, when the instruction information instructs activation of the redundant transmission function for the radio bearer to perform PDCP redundant transmission through the MAC CE, data that has been copied in the PDCP entity for the corresponding radio bearer and transmitted may be redundantly received through an RLC entity of the base station and an RLC entity of another base station configuring dual connectivity for the UE. For example, when the instruction information instructs the activation, an MAC entity of the UE may instruct an upper layer to activate the redundant transmission operation of the PDCP entity. That is, when the instruction information received through the MAC CE instructs the activation of the redundant transmission function, the MAC entity of the UE may transmit the instruction information to the upper layer (for example, an RRC layer or a PDCP layer) and may instruct the upper layer to activate the redundant transmission function.

When the instruction information instructs the activation, the base station may redundantly receive the data that has been copied in the PDCP entity of the UE and transmitted, through the RLC entity of the base station and the RLC entity of the other base station configuring dual connectivity for the UE. In this case, the UE may copy a PDCP PDU from the PDCP entity for the radio bearer to perform PDCP redundant transmission of the UE, and the UE may transmit the copied PDCP PDU to different RLC entities configured in the UE for the corresponding radio bearer, so that the base station may redundantly receive the same data through a plurality of RLC entities. The plurality of RLC entities may be configured in the UE for each base station configuring the dual connectivity, and the pluralit of RLC entities may be associated with one PDCP entity. Similarly, a PDCP entity of the base station may be associated with an RLC entity of the corresponding base station, and the PDCP entity may be associated with an RLC entity of another base station constituting dual connectivity. The plurality of RLC entities may be associated with a corresponding single PDCP entity through a radio bearer identifier or a logical channel identifier.

Accordingly, when the PDCP entity of the UE transmits the same data to the plurality of associated RLC entities, the PDCP entity of the base station may redundantly receive the same data. Specifically, the base station may receive data through radio resources between the base station and the UE, and the base station may also receive the same data through an interface between the base stations from another base station. In this case, the PDCP entity of the base station may remove any one of redundantly received data packets and may transmit the corresponding data to the upper layer.

Unlike this, when the instruction information instructs deactivation and the redundant transmission operation of the PDCP entity is configured in the UE, the PDCP entity of the base station may receive data only through the RLC entity of the base station. For example, the received data packet may be first transmitted to the upper layer and a data packet having the same SN received thereafter may be removed.

Meanwhile, the above-described redundant transmission function may be configured only for a DRB. For example, the redundant transmission function in the PDCP entity may not be configured for the signaling radio bearer, but may be configured only for the DRB.

In addition, the instruction information may instruct each of one or more DRBs to activate or deactivate the redundant transmission operation of the PDCP entity. For example, the instruction information may include information on whether the redundant transmission function of the PDCP entity is activated or deactivated for each DRB configured in the UE. In this case, the PDCP redundant transmission function may be instructed to be activated for the specific DRB, but may be instructed to be deactivated for another DRB. In order to instruct whether the redundant transmission operation of the corresponding PDCP entity is activated or deactivated for each of the one or more DRBs, the instruction information provided through the MAC CE may include bitmap information for instructing an activation/deactivation state for each radio bearer corresponding to each radio bearer identifier.

In this specification, the PDCP entity, the RLC entity, and the MAC entity are described based on the LTE terminology, but names thereof may be changed in the NR radio access technology. Therefore, the PDCP entity, the RLC entity, and the MAC entity in the present disclosure should be understood to refer to an entity that performs each function in the LTE radio access technology, and there is no limitation in the names thereof. For example, the RLC entity refers to an entity that receives data from a lower layer and transmits the data to an upper layer, performs data segmentation and reassembly, and performs reordering, and the like, and there is no limitation in the name.

As described above, according to the present embodiment, it may determine whether the redundant transmission is performed for each DRB, thereby minimizing radio resource waste and data processing time loss due to the redundant transmission. In addition, the redundant transmission function may be configured in the UE and it may dynamically control whether the redundant transmission function is activated or deactivaed through the MAC CE, thereby providing a dynamic management effect for radio resources.

Hereinafter, more various embodiments for performing the redundant transmission function in the PDCP entity will be described for each embodiment. These embodiments may be performed by the the above-described UE and base station, and if necessary, some or all of the operations in FIG. 2 and FIG. 3 may be omitted, changed, substituted and added according to the following embodiments.

First Embodiment

Method of Configuring Activation/Deactivation Instruction Information of Redundant Transmission Via Multiple Paths When redundant transmission is configured to be always performed via a plurality of paths, excess radio resources may be wasted. For example, in order to reduce the radio resource consumption due to the redundant transmission, a method of activating/deactivating or turning on/off (referred to as activation/deactivation for convenience of description in this specification, and also referred to as enable/disable, on/off, activation/deactivation, etc.) a corresponding function (redundant transmission function) may be used.

As to downlink a redundant RRC message transmission, the base station may efficiently determine the redundant RRC message transmission on implementation to transmit corresponding data.

The base station transmits an RRC message via two paths in the RRC or PDCP entity.

The UE that has received the RRC message via two paths may confirm and process the received RRC message in the PDCP or RRC. For example, the recevied data may be first processed and redundant data may be discarded. For another example, a function of detecting and discarding redundant data may be performed in the PDCP entity. Specifically, a transmission side may transmit data having the same PDCP SN via two paths, and a reception side may detect and discard redundant data based on the PDCP SN. For still another example, a PDCP SN with a new PDCP SN is stored. When a PDCP SDU having the same PDCP SN is stored in the UE (or the PDCP entity), the UE discards the PDCP SDU. The base station may instruct configuration information for the UE to process this operation.

Meanwhile, in order for the UE to efficiently process the uplink redundant RRC message transmission, it is necessary to control the UE to transmit the RRC message via the two paths in the RRC or PDCP entity by the control of the base station.

The base station may instruct the UE to activate/deactivate the uplink redundant RRC message transmission. For example, the base station may transmit the instruction information instructing whether a redundant RRC message transmissionis activated or deactivated to the UE through the RRC message. The PDCP entity of the UE may be configured to transmit data having the same PDCP SN via two paths.

For example, in a case in which the base station sets the instruction information instructing whether a redundant RRC message transmission is activated or deactivated to be activated and instructs the UE to perform activation, the UE may enable the PDCP entity to transmit the corresponding RRC message via the two transmission paths when the uplink RRC message is generated.

For another example, in a case in which the base station sets the instruction information instructing whether a redundant RRC message transmission is activated or deactivated to be deactivated and instructs the UE to perform deactivation, the UE may enable the PDCP entity to transmit the corresponding RRC message via a single transmission path when the uplink RRC message is generated.

For still another example, in a case in which the base station sets the instruction information instructing whether a redundant RRC message transmission is activated or deactivated to be deactivated and instructs the UE to perform deactivation, the UE may enable the PDCP entity to transmit the corresponding RRC message via a designated transmission path when the uplink RRC message is generated. The transmission path for this may be configured in advance in the UE or may be instructed by the base station. This may be an RLC entity configured by default for the corresponding radio bearer. The RLC entity may be used for convenience of explanation as described above, and may have various names such as a configured RLC entity, a primary RLC entity, a default RLC entity, a first configured RLC entity, and the like, and there is no limitation in the names.

In this manner, the above-described instruction information instructing whether the redundant transmission is activated or deactivated may be instructed to the UE by upper layer signaling.

Second Embodiment

Method of Configuring Timer for Redundant Transmission Activation/Deactivation Via Multiple Paths When redundant transmission is always performed via a plurality of paths, excess radio resources may be wasted.

As to downlink a redundant RRC message transmission, the base station may efficiently determine a redundant RRC message transmission on implementation to transmit corresponding data.

Meanwhile, in order for the UE to efficiently process the uplink the redundant RRC message transmission, it is necessary to control the UE to transmit the RRC message via the two paths in the RRC or PDCP entity by the control of the base station.

When the redundant transmission via the two paths is instructed, it may not be desirable that the redundant transmission is continuously performed during an RRC connection. Thus, the base station may instruct a timer for multipath redundant transmission.

For example, the base station may instruct a redundant transmission activation timer. When the UE receives the RRC message including the redundant transmission activation timer, it starts the corresponding timer. When an uplink RRC message is generated while the corresponding timer is operating, the UE may enable the PDCP entity to transmit the corresponding RRC message via the two transmission paths. When the RRC message is generated after the corresponding timer expires, the UE may enable the PDCP entity to transmit the generated RRC message via one transmission path. The transmission path for this may be configured in advance in the UE or may be instructed by the base station. This may be an RLC entity configured by default for the corresponding radio bearer. The RLC entity may be used for convenience of explanation as described above, and may have various names such as a configured RLC entity, a primary RLC entity, a default RLC entity, a first configured RLC entity, and the like, and there is no limitation in the names.

For another example, when the redundant transmission is activated, the base station may instruct a timer for deactivating redundant transmission. After receiving the RRC message including the timer for deactivating the redundant transmission, the UE to starts the corresponding timer when the the redundant transmission is activated according to a specific instruction or condition. When the uplink RRC message is generated while the timer is operating, the UE may enable the PDCP entity to transmit the corresponding RRC message via the two transmission paths. When the RRC message is generated after the timer expires, the UE may enable the the PDCP entity to transmit the generated RRC message via one transmission path.

For still another example, when the uplink RRC message is generated while the timer for deactivating the redundant transmission is generated, when the PDCP entity transmits the corresponding RRC message via the two transmission paths, or when the PDCP entity proceses redundant transmission, the UE may restart the timer. When the RRC message is generated after the timer expires, the UE may enable the PDCP entity to transmit the generated RRC message via one transmission path.

Third Embodiment

Method for Instructing Activation/Deactivation Through Lower Layer Information

The base station may check a radio link quality status of the UE through an RRM measurement report, CQI feedback, or the like from the UE. Therefore, the base station may instruct redundant transmission activation/deactivation through lower layer information.

For example, whether a redundant transmission function in the PDCP entity configured in the UE is activated or deactivated may be indicated through the MAC CE. That is, when the redundant transmission function in the PDCP entity is configured in the UE, the base station may enable instruction information instructing activation or deactivation of the corresponding function to be included in the MAC CE and may transmit the instruction information to the UE. The corresponding instruction information may include information for instructing whether the redundant transmission function is activated or deactivated for each DRB. When the instruction information instructs activation, the UE may redundantly transmit data through a plurality of radio paths. To this end, the PDCP entity may transmit the same PDCP PDU to different RLC entities. In order to instruct whether the redundant transmission operation of the corresponding PDCP entity is activated or deactivated for each of one or more DRBs, the instruction information provided through the MAC CE may include bitmap information for instructing an activation/deactivation state for each radio bearer corresponding to each radio bearer identifier.

For another example, the base station may instruct the instruction information instructing whether the redundant transmission function is activated or deactivated, through PDCCH.

For still another example, when receiving the instruction information through the MAC CE or the PDCCH, the UE may transmit the instruction information to the RRC or PDCP layer that processes the redundant transmission.

For yet another example, the base station may instruct the instruction information through PDCP control data.

Fourth Embodiment

Method of Instructing Condition for Activating/Deactivating Redundant Transmission Function Configuration information instructing the UE to configure the redundant RRC message transmission may include condition information for activating/deactivating the redundant RRC message transmission. Alternatively, the configuration information may include switching information for instructing the UE to switch a data transmission path between two paths having dual connectivity, and the switching information may include condition information for switching the data transmission path. For convenience of description, a condition for activating the redundant transmission will be described below. A condition for instructing to switch the data transmission path between two paths configured by dual connectivity may be also set in the same or similar manner. The corresponding condition may be included in the condition information described above.

For example, a reference radio signal quality value for activating the redundant RRC message transmission may be included in the condition information. For example, when the radio quality of a MeNB (or a master TRP, master cell, Pcell, anchor beam, or best beam, represented by a MeNB for convenience of explanation, but an arbitrary transmission signal on NR is also included in the scope of the present embodiment) satisfies (or exceeds or is equal to or greater than) the reference radio quality value, the UE does not need to activate the redundant RRC transmission. For example, when the radio quality of the MeNB is greater than (or equal to or greater than) the reference radio signal quality value instructed by the base station, the UE may enable the PDCP entity to transmit the RRC message via one transmission path. That is, the corresponding RRC message may be transmitted through the MeNB. By way of another example, when the radio quality of the MeNB is less than (or equal to or less than) the reference radio signal quality value instructed by the base station, the UE may activate the redundant RRC transmission. That is, when the radio quality of the MeNB is less than (or equal to or less than) a threshold value instructed by the base station, the UE may enable the PDCP entity to transmit the RRC message via two transmission paths.

For still another example, the corresponding condition may be an uplink data separation threshold value. In a case in which the redundant data transmission is configured but is deactivated or the redundant data transmission is configured and is activated, when available PDCP data volume and RLC data volume associated with two RLC entities are less than the corresponding condition, the PDCP data may be transmitted to the configured single path RLC entity.

For yet another example, when the radio quality of the SeNB is greater than (or equal to or greater than) the threshold value instructed by the base station, the UE may enable the PDCP entity to transmit the RRC message via one transmission path. For example, the UE may transmit data only through the SeNB.

For yet another example, data may be instructed to be transmitted via a path that provides better radio quality among the MeNB and the SeNB.

For yet another example, when the radio qualities of both the MeNB and the SeNB are smaller than (or equal to or smaller than) a specific threshold value, the PDCP entity may transmit the RRC message via two transmission paths. For this operation, when the condition for activating/deactivating the redundant RRC transmission is satisfied, a physical layer may transmit the satisfaction of the condition to the upper layer. For example, when a PDCP layer transmits the satisfaction of the condition through two transmission paths, the physical layer may instruct the PDCP entity of the satisfaction of the condition. Alternatively, when an RRC layer transmits the satisfaction of the condition through two transmission paths, the physical layer may instruct the RRC of the satisfaction of the condition.

When it is instructed that the corresponding condition is satisfied, the PDCP entity may activate or deactivate the redundant transmission.

To this end, the base station may instruct the UE of at least one of a threshold value of the radio quality associated with activation/deactivation, a threshold condition (for example, the frequency of quality higher than a threshold value, the frequency of quality lower than a threshold value, the frequency of consecutive out of sync, a threshold value of uplink data separation data quantity, or the like), a timer for checking the threshold condition, a period for checking the threshold condition, an instruction condition toward the upper layer, and a filtering parameter. For example, an RLM procedure may be used for this. For another example, RRM measurement may be used for this. For still another example, beam measurement may be used for this.

The UE may monitor downlink radio quality for a specific cell in a master cell group or for all the cells in the master cell group. The monitoring may be for triggering (determining/suspending/canceling/stopping) redundant RRC transmission or redundant PDCP data (PDCP SDU or PDCP PDU) transmission. Alternatively, the monitoring may be for instructing the upper layer of a status for redundant RRC transmission or Redundant PDCP data transmission.

Similarly, the UE may monitor the downlink radio quality for a specific cell in a secondary cell group or for all the cells in the secondary cell group. The monitoring may be for triggering (determining/suspending/canceling/stopping) redundant RRC transmission or redundant PDCP data (PDCP SDU or PDCP PDU) transmission. Alternatively, the monitoring may be for instructing the upper layer of a status for redundant RRC transmission or redundant PDCP data transmission.

When an RLM is used, the base station may instruct a threshold value for instructing the upper layer when the physical layer of the UE performs an RLM operation. The corresponding threshold value may be a threshold value separate from the threshold value for an existing general RLM operation.

Through the embodiments described above, it is possible to minimize radio resource waste and data processing time loss due to the redundant transmission.

Hereinafter, a method of transmitting and processing an RRC message via two radio links by applying LTE-NR dual connectivity will be described in detail.

For convenience of description, the case of an LTE (master node)—a NR (secondary node) capable of utilizing well-established LTE coverage will be described below as an example. However, as described above, this is for convenience of description, and the cases of a NR (master Node)—a NR (secondary Node) and a NR (Master Node)—an LTE (Secondary Node) are also included in the scope of the present embodiment.

A NR base station may control NR radio resources of a UE. Alternatively, an LTE base station may control NR radio resources of a UE.

The NR base station may perform one or more control functions of NR cell (cell group, transmission point, transmission point group, transmission/reception point, transmission/reception point group, TRP, antenna, antenna group, or beam, hereinafter referred to as "cell") addition (modification, release, or management), NR measurement, NR measurement reporting, NR resource allocation, NR radio bearer addition/correction/release, NR radio resource configuration, and NR mobility control. The NR base station may instruct a UE to perform the above-described one or more control functions via an RRC configuration or reconfiguration message.

For example, an LTE RRC entity of the LTE base station and a NR RRC entity of the NR base station may independently instruct corresponding base station radio resource control configuration. For another example, the LTE RRC entity of the LTE base station may independently instruct corresponding base station radio resource control configuration via an interface between an LTE and a UE, and the NR RRC entity of the NR base station may independently instruct corresponding base station radio resource control configuration via an interface between a NR and a UE. For still another example, the LTE RRC entity of the LTE base station and the NR RRC entity of the NR base station may independently instruct corresponding base station radio resource control configuration within a range not exceeding UE capability. For yet another example, the LTE RRC entity of the LTE base station and the NR RRC entity of the NR base station may instruct corresponding base station radio resource control configuration through coordination. For further another example, the LTE RRC entity of the LTE base station may instruct LTE base station radio resource control configuration via an LTE radio link and a NR radio link. For further still another example, the NR RRC entity of the NR base station may instruct the LTE base station radio resource control configuration via the NR radio link and the LTE radio link.

When each base station (or UE) transmits one RRC message via two radio links for the purpose of reliable RRC message transmission (or for any reason), the base station (or UE) transmits the RRC message via the two radio links and the corresponding UE (or base station) should be able to perform reception processing by discriminateing the RRC messages. The following method may be used individually or in combination for this purpose.

For convenience of explanation, in the following description, a case in which a NR base station (or a UE) transmits/receives data to/from corresponding UE (or NR base station) (for example, when a NR RRC message is transmitted via two paths) will be described, but a case in which an LTE base station transmits/receives data to/from corresponding UE (or LTE base station) (for example, when an LTE RRC message is transmmitted via two paths or when an RRC message of a MeNB is transmitted to an interface between the MeNB and a UE and an interface between a SeNB and a UE) is also included in the scope of the present embodiment.

1. Method in which RRC Layer Transmits and Receives Data Via Two Links

A NR RRC entity of a NR base station (or UE) generates a NR RRC message. Next, the NR RRC message is transmitted through a NR-SRB1 to be transmitted to a radio link between the NR base station and a UE. Alternatively, the NR RRC message may be submitted to a lower layer. Next, the NR RRC entity of the NR base station (or is UE) may transmit the NR RRC message to the UE (or NR RRC) through an LTE base station. As to a downlink RRC message, the NR base station (the RRC entity of the NR base station) transmits the NR RRC message including a NR RRC container/NR RRC IEs/NR RRC IEs to the LTE base station. The LTE base station (or the RRC entity of the LTE base station) may transmit the NR RRC message including the NR RRC container/NR RRC IEs/NR RRC IEs to the UE (or LTE RRC entity of the UE) through an LTE SRB (LTE SRB1). Next, the LTE RRC entity of the UE transmits the RRC message to the NR RRC entity of the UE.

The LTE RRC may enable the RRC message including the NR RRC container/NR RRC IEs/NR RRC IEs to be included in an RRC reconfiguration message in a transparent container, and the LTE RRC may transmit the RRC reconfiguration message to the UE.

In this regard, for example, information for instructing to transmit a radio link path of one uplink RRC message to two links may be included in the RRC message and configured in the UE. For another example, information for instructing to copy one uplink RRC message and transmitting the copied one uplink RRC message to two links may be included in the RRC message and configured in the UE. For still another example, instruction information for designating the radio link path of the uplink RRC message may be included in the RRC message and configured in the UE. For yet another example, information for copying one uplink RRC message and transmitting the copied one uplink RRC message to two radio links may be included in the RRC message and configured in the UE.

2. Method in which PDCP Layer Transmits and Receives Data Via Two Links

A NR RRC entity of a NR base station (or UE) generates a NR RRC message. Next, the generated NR RRC message is transmitted through a NR-splitSRB1 to be transmitted to a radio link between the NR base station and a UE. Alternatively, the NR RRC message may be submitted to a lower layer. The NR RRC entity of the NR base station (or UE) may transmit the generated NR RRC message to a PDCP entity (upper L2 entity).

For example, the PDCP entity (upper L2 entity) copies a PDCP SDU including the NR RRC message. Next, the PDCP PDU including one NR RRC message is transmitted to an LTE RLC entity. A PDCP PDU including another NR RRC message is transmitted to the NR L2 entity.

Meanwhile, for example, information for instructing the upper L2 entity (PDCP) to enable a function of sending PDCP data including an uplink RRC message to two radio links may be included in the RRC message and configured in the UE.

For another example, information for instructing the upper L2 entity to copy the PDCP SDU/PDU and/or to submit the PDCP SDU/PDU to respective associated lower layer entities so that the PDCP (upper L2 entity) sends the PDCP data including the uplink RRC message to two radio links may be included in the RRC message and configured in the UE.

For still another example, instruction information for designating the radio link path of the uplink RRC message may be included in the RRC message and configured in the UE.

For yet another example, the same copied PDCP data may be discarded in a peered PDCP entity. The base station may instruct the UE of information for instructing the UE to include the same RRC message and to discard the redundantly received PDCP PUD/SUD.

For further another example, the NR RRC entity of the NR base station (or UE) generates a NR RRC message. Next, the NR RRC entity of the NR base station (or UE) copies the generated NR RRC message. The NR RRC entity transmits the NR RRC message through a NR-splitSRB1 to transmit the generated NR RRC message to a radio link between a NR base station and a UE and a radio link between an LTE base station and a UE. Alternatively, the NR RRC message may be submitted to a lower layer. The NR RRC entity of the NR base station (or UE) transmits the generated NR RRC message to the PDCP entity (upper L2 entity). The PDCP entity differentiates between a path of a PDCP SUD including the first received RRC message and a path of a PDCP SUD including the next received RRC message (radio link of the LTE base station and radio link of NR base station), and transmits corresponding data.

Here, a case in which the NR base station is a MeNB has been described as an example, but the present disclosure may be equally applied in a case in which the LTE base station is a MeNB. In this case, a split SRB may be branched from the PDCP entity of the LTE base station, and the PDCP entity of the LTE base station may perform copying and discarding of PDCP data.

3. Method of Adding RRC Message Identification Information/Sequence Number Field A transmission device (e.g., UE) may transmit an RRC message via two radio links for the purpose of reliable RRC message transmission (or for any reason), and a reception device (e.g., UE) may discriminate the redundant RRC message from the same RRC message received via the two radio links and may discard/drop/remove the redundant RRC message. The base station may configure information for instructing the UE of this.

The transmission device (e.g., base station or UE) may enable the RRC message to include identification information for discriminateing the same RRC message. For example, the identification information for discriminateing the RRC messages is incremented each time a new RRC message is generated. Next, when the identification information reaches the largest value, it is possible to return to the smallest value. For example, when the identification information has values 0 to 3 (or 1 to 4), a first RRC message starts from 0 (or 1) and is incremented by one, and when the identification information reaches 3 (or 4), the next RRC message is circulated to 0 (or 1) again.

When receiving the RRC message including the same RRC message identification information as the previously received RRC message, the reception device (corresponding UE or base station) may discard/drop/remove the corresponding RRC message.

When receiving the RRC message including the same RRC message identification information as the previously received RRC message, the reception device (corresponding UE or base station) may transmit an acknowledgment message of the received RRC message to the transmission UE.

The base station may configure information for instructing the RRC message identification information to be included in the RRC message, in the UE. When the corresponding information is configured, the UE may recognize that the RRC message identification information is included in the RRC message.

4. Method of Using Transaction Identifier

A transmission device (e.g., UE) may transmit an RRC message via two radio links for the purpose of reliable RRC message transmission (or for any reason), and a reception device (e.g., UE) may discriminate the redundant RRC message from the same RRC message received via the two radio links and may discard/drop/remove the redundant RRC message. The base station may configure information for instructing the UE of this.

The redundant RRC message may be discriminated and discarded/dropped/remove using a transaction identifier included in the RRC message.

When it is included, the same RRC transaction identifier as an RRC transaction identifier included in a message received from the base station that triggers a response message is set in the response message.

In order to discriminate the redundant RRC message from the RRC message that does not trigger the response message, the transaction identifier may be included in the RRC message that does not trigger the response message, and the RRC message may be transmitted. For example, the transaction identifier may be included in a MeasurementReport message and the MeasurementReport message may be transmitted. As another example, the transaction identifier may be included in all of the RRC messages and the RRC messages may be transmitted.

When receiving the RRC message including the same transaction identifer as the previously received RRC message, the reception device (corresponding UE or base station) may discard/drop/remove the corresponding RRC message.

When receiving the RRC message including the same RRC message identification information as the previously received RRC message, the reception device (corresponding UE or base station) may transmit an acknowledgment message of the received RRC message to the transmission UE.

Meanwhile, hereinafter, an embodiment in which dual connectivity is configured to transmit RRC signaling will be described. That is, methods of transmitting radio resource control signaling to a UE will be described. The following methods may be used independently or in combination for RRC signaling transmission. For convenience of description, a signaling radio bearer is described, but a data radio bearer may be configured in the same or similar manner.

1. Using LTE Base Station SRB (Signaling Radio Bearer)

For example, a NR base station may transmit a NR RRC message (for example, an RRC message generated by the NR base station) to a UE through an LTE base station. To this end, as to a downlink RRC message, the NR base station (or RRC entity of the NR base station) transmits the NR RRC message including NR RRC container/NR RRC IEs/NR RRC IEs to the LTE base station. The LTE base station (or RRC entity of the LTE base station) may transmit the RRC message including the NR RRC container/NR RRC IEs/NR RRC IEs to the UE (or an RRC entity of the UE) through an LTE SRB. The LTE RRC may enable the RRC message including the NR RRC container/NR RRC IEs/NR RRC IEs to be included in an RRC reconfiguration message in a transparent container, and the LTE RRC may transmit the RRC reconfiguration message to the UE.

This method is advantageous in that the RRC configuration information of the NR base station can be transmitted to the UE while a change in the LTE base station is reduced. However, this method may cause an increase in delay due to data transmission between the LTE base station and the NR base station. In addition, the NR base station should receive an acknowledgment message of the NR RRC configuration of the UE from the LTE base station. This also causes the delay.

As an example for solving the above-described problem, when a UE transmits the RRC message including the NR RRC container/NR RRC IEs/NR RRC IEs to the UE (or the RRC entity of the UE), the LTE base station may instruct the RRC entity of the UE to directly transmit an RRC reconfiguration acknowledgment message.

For example, the LTE RRC entity of the UE that has received the RRC message including the NR RRC container/NR RRC IEs/NR RRC IEs via an LTE SRB transmits/submits the received RRC message to the NR RRC entity. The NR RRC entity applies a new configuration. The NR RRC entity responds with the RRC reconfiguration acknowledgment message through an interface between the UE and the NR base station.

For another example, the RRC entity of the UE that has received the RRC message including the NR RRC container/NR RRC IEs/NR RRC IEs via the LTE SRB applies a new configuration. The RRC entity of the UE responds with the RRC reconfiguration acknowledgment message through the interface between the UE and the NR base station.

The RRC reconfiguration message (or the RRC message including the NR RRC container/NR RRC IEs/NR RRC IEs) may include information for instructing such an operation of the UE by the NR base station (or LTE base station).

For example, the RRC reconfiguration message (or the RRC message including the NR RRC container/NR RRC IEs/NR RRC IEs) may include information for instructing the UE to create/enable/activate the NR RRC entity.

For another example, when the UE receives the RRC message including the NR RRC container/NR RRC IEs/NR RRC IEs (or an RRC message including information for instructing initial NR additional configuration setup), the UE may enable the NR RRC entity to enable/activate the NR additional configuration (or the UE may set/create the NR RRC entity.

For still another example, when receiving the RRC message including information for instructing NR radio resource release, the UE may enable the NR RRC entity to disable/deactivate/release the received RRC message.

For yet another example, the RRC reconfiguration message (or the RRC message including the NR RRC container/NR RRC IEs/NR RRC Ies) may include information for instructing the UE to transmit the RRC acknowledgment message via an interface between the UE and the base station.

For further another example, the RRC reconfiguration message (or the RRC message including the NR RRC container/NR RRC IEs/NR RRC IEs) may include NR base station SRB configuration information for the NR RRC entity transmitting the RRC acknowledgment message through the interface between the UE and the NR base station.

2. SRB Configuration Through NR Base Station

For example, a NR base station may transmit a NR RRC message to a UE through an interface between the NR base station and the UE. For this purpose, when LTE-NR dual connectivity is configured in the UE (or when NR additional radio resource is configured), the NR base station may configure an SRB (for example, SRB1) between the UE and the NR base station. This means that the NR base station determines SRB addition (for example, SRB1) between the UE and the NR base station and generates configuration information for the determined SRB addition. For reference, in the typical LTE, the SRB1 is performed in RRC connection setup, but SRB1 setting between the NR base station, and the UE (hereinafter, a signaling radio bearer configured to transmit data through the interface between the NR base station and the UE is referred to as NR-SRB1, but is not limited to the corresponding term) may be configured through the RRC reconfiguration message (configuring NR additional radio resources) that configures LTE-NR dual connectivity (configures NR additional radio resource).

When security is activated, integrity protection and ciphering should be performed with respect to all the RRC messages on the NR-SRB1 (or SRB1/SRB2) by PDCP (or L2 entity on NR). LTE-NR dual connectivity may be considered to be applied to an RRC connected UE. Accordingly, integrity protection and ciphering should be performed with respect to all the RRC messages on the NR-SRB1 by the PDCP (or L2 entity on NR).

To this end, as to the NR-SRB1, security should be always activated from the start. The LTE base station should not set the corresponding bearer before activating security for the bearer. The LTE base station should not request NR base station addition before activating security. The NR base station may set the NR-SRB1 according to the NR base station addition request of the LTE base station.

For example, when the NR base station addition is requested, the LTE base station transmits (or calculates and transmits) a NR base station key (e.g., NR-$K_{eNB}$) to the NR base station. The NR base station selects an integrity protection algorithm and a ciphering algorithm. Next, the selected integrity protection algorithm and cipher algorithm (or identification information for the integrity protection algorithm and the cipher algorithm) for serving the NR-SRB1 to the UE are transmitted to the UE through the LTE base station. The LTE base station (or the NR base station) instructs the UE of a counter (SCG counter or NR counter) for the UE to calculate a key value associated with the NR-SRB1. The UE calculates the key value (NR-$K_{RRCint}$ or NR-$K_{RRCenc}$) associated with the NR-SRB1. The UE configures a lower layer (PDCP or L2 entity on NR) to apply the integrity protection algorithm, the ciphering algorithm, NR-$K_{RRCint}$, and NR-$K_{RRCenc}$.

Figure 4:
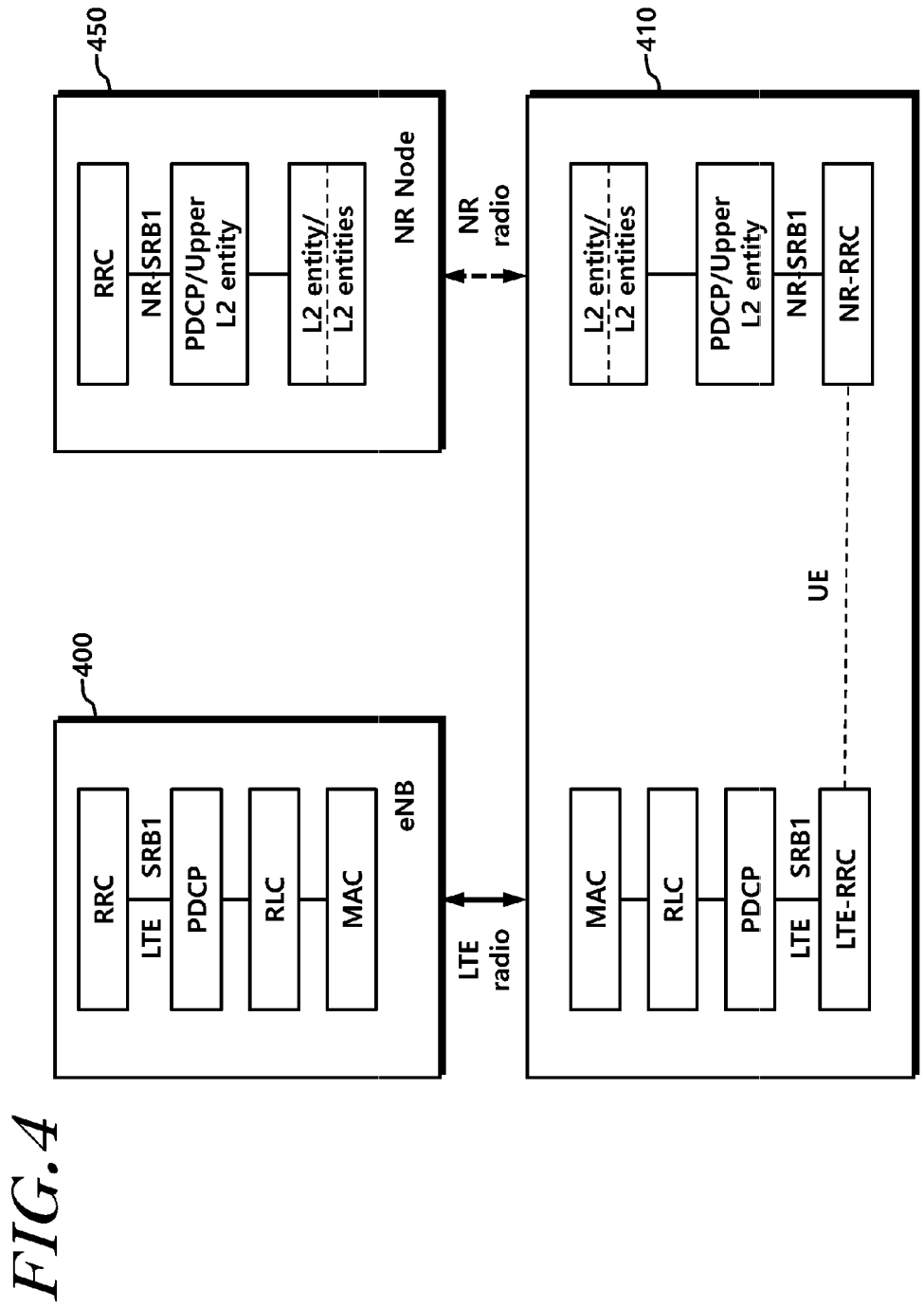
FIG. 4 is a diagram for illustrating a dual connectivity SRB configuration according to an embodiment.

FIG. 4 is a diagram for illustrating a dual connectivity SRB configuration according to an embodiment.

For example, an L2 entity of a NR base station 450 of FIG. 4 may be composed of one or two entities that redistribute RLC entity and LTE MAC entity functions of an LTE 400. FIG. 4 shows an example in which an LTE-RRC entity and a NR-RRC entity are configured in a UE 410, but an example in which an RRC entity and an RRC layer are configured as one in the UE 410 is also included in the scope of the present disclosure.

When the RRC entity and the RRC layer are configured as one in the UE 410, an RRC message received from the NR base station 450 and a corresponding response RRC message may be transmitted through a NR-SRB1. When two RRC entities are configured in the UE 410, the RRC message received from the NR base station 450 and the corresponding response RRC message may be transmitted through the NR-SRB1. The NR base station 450 may process the NR-SRB1 in preference to a DRB. For example, it is possible to designate a specific logical channel identification information (logicalchannelIdentity) value with respect to the NR-SRB1. For another example, it is possible to designate the same logical channel identification information value (logicalchannelIdentity) (for example, 1) as that of the SRB1 with respect to a NR-splitSRB1. For still another example, it is possible to designate the same SRB identification information value (SRB-identity) value (for example, 1) as that of the SRB1 with respect to the NR-SRB1. For yet another example, it is possible to designate the same/similar logical channel identification information (for example, priority (1 or 2), prioritisedBitRate(infinite)) as/to the SRB1 with respect to the NR-SRB1. For further another example, the UE includes the same logical channel identification information as is that of the SRB1, but the UE may include information for identifying an SCG SRB1.

For further still another example, the UE may include logical channel identification information different from that of the SRB1, but may include the same logical channel configuration information as that of the SRB1.

The NR base station 450 may transmit, to the UE 410, a NR RRC message including one or more pieces of control information among NR cell/cell group/transmission point/transmission point group/transmission and reception point/transmission and reception point group/TRP/antenna/antenna group/beam addition/modification/release/management, NR measurement, NR measurement reporting, NR resource allocation, NR radio bearer addition/modification/release, NR radio resource configuration, and NR mobility control. The NR base station (or RRC entity of the NR base station) 450 for a downlink RRC message may transmit the NR RRC message including the NR RRC container/NR RRC IEs/NR RRC IEs to the UE 410 via the NR-SRB1.

When receiving the NR RRC message (for example, an RRC connection reconfiguration message) through the NR-SRB 1, the UE may apply a new configuration by using the following methods individually or in combination. The NR RRC message includes radio resource configuration information for the NR base station. For example, as described above, in the case of dual connectivity, the NR RRC message may include SeNB (NR base station) radio resource configuration information.

2-1) Method of Applying New Configuration Through One RRC Entity in UE

A UE may configure NR radio resources through an RRC entity.

In the typical LTE dual connectivity, in a case in which a MeNB transmits an RRC message including a new radio resource configuration of an SCG to the UE, when the UE cannot comply with (part of) a configuration included in an RRC connection reconfiguration message, the UE performs a reconfiguration failure procedure.

In LTE, the reconfiguration failure procedure may be performed as follows.

When the UE cannot comply with (part of) the configuration included in the RRC connection reconfiguration message, the UE may continue to use a configuration that is used before receiving the RRC connection reconfiguration message. When security is not activated, an operation of leaving RRC CONNECTED using a release cause as other. Otherwise, a connection re-establishment procedure is initiated.

As described above, in the typical LTE, a reconfiguration failure needs to switch the UE into an idle mode or to perform the connection re-establishment procedure, thereby causing service interruption.

Meanwhile, due to characteristics of NR, there are various reasons for occurrence of a failure in the NR radio resource configuration process. Therefore, when a failure occurs in the NR radio resource configuration process for any reason, it may be ineffective to switch the UE to the idle mode or to perform the RRC connection re-establishment procedure.

As an example for solving this problem, when the UE fails in the NR configuration included in the NR RRC message (or when the UE cannot comply with the NR configuration included in the NR RRC message for any reason), the UE may not trigger a reconfiguration failure procedure. That is, the NR RRC configuration failure may be prevented from triggering an LTE RRC configuration failure. For example, when the UE fails in the NR RRC configuration, the UE may transmit the RRC message (e.g., an SCG failure information message, a UE assistance message, or a NR failure information/NR status message to be newly defined) including the cause of the NR RRC configuration failure to the NR base station. For another example, when the UE fails in the NR RRC configuration, the UE may transmit the RRC message (e.g., an SCG failure information message, a UE assistance message, or a NR failure information/NR status message to be newly defined) including the cause of the NR RRC configuration failure to the LTE base station. That is, when the UE fails in the radio resource configuration of the SeNB using the RRC message received through the SRB of the SeNB, the UE may transmit corresponding failure information to the MeNB.

Hereinafter, the above mentioned procedure will be described in more detail.

The received RRC message may include configuration information (e.g., including one or more pieces of information among NR cell configuration information, NR bearer configuration information, control information for NR random access, NR measurement configuration information, NR mobility control, and configuration information for NR radio resource) for configuring the NR radio resource. Hereinafter, for convenience of explanation, configuration information for further modifying the NR base station in dual connectivity or information for reconfiguring the NR radio resource through a SeNB SRB is referred to as SeNB radio resource configuration information, NR radio resource configuration information, NR configuration information, or configuration information.

For example, when an RRCConnectionReconfiguration message received via a MeNB SRB includes the NR radio resource configuration information, the UE (e.g., UE RRC entity) performs NR configuration.

For another example, when the RRCConnectionReconfiguration message received via a SeNB SRB includes the NR radio resource configuration information, the UE (e.g., UE RRC entity) performs NR configuration.

In each of the above-described examples, when the UE cannot comply with the NR configuration, the UE continues to use the (NR) configuration that is used before receiving the RRC connection reconfiguration message (before receiving the NR configuration information).

Alternatively, when the UE (RRC) cannot comply with the NR configuration, the use of the NR radio resource may be suspended/stopped/releasesd. The NR radio resource may include at least one of a secondary cell group DRB, a secondary cell group SRB, a secondary cell group portion of a split DRB, and a secondary cell group portion of a split SRB.

Alternatively, when the UE (RRC) cannot comply with the NR configuration, the RRC transmits an RRC message including the cause of the NR RRC configuration failure to the LTE base station. The LTE base station delivers the RRC message to the NR base station.

Alternatively, when the RRC cannot comply with the NR configuration, the RRC may directly transmit the RRC message including the cause of the NR RRC configuration failure to the NR base station through an interface between the UE and the NR base station.

2-2) Method of Applying New Configuration Through Two RRC Entity in UE

As described above, the NR may independently include LTE and other evolutionary features. In order to effectively implement this, the UE may configure an LTE RRC and a NR RRC.

In the typical LTE dual connectivity, in a case in which a MeNB transmits an RRC message including a new radio resource configuration of a SCG to the UE, when the UE cannot comply with (part of) the configuration included in an RRC connection reconfiguration message, the UE performs a reconfiguration failure procedure. In LTE, the reconfiguration failure procedure is performed as follows.

When the UE cannot comply with (part of) the configuration included in the RRC connection reconfiguration message, the UE may continue to use a configuration that is used before receiving the RRC connection reconfiguration message. When security is not activated, an operation of leaving RRC_CONNECTED with a release cause as other. Otherwise, a connection re-establishment procedure is initiated.

As described above, in the typical LTE, a reconfiguration failure needs to switch the UE into an idle mode or to perform the connection re-establishment procedure, thereby causing service interruption.

Meanwhile, due to characteristics of NR, there are various reasons for occurrence of a failure in a NR addition process. Therefore, when a failure occurs in the NR addition process for any reason, it may be ineffective to switch the UE to the idle mode or to perform the RRC connection re-establishment procedure.

As an example for solving this problem, when the UE fails in the NR configuration included in the NR RRC message (or when the UE cannot comply with the NR configuration included in the NR RRC message for any reason), the UE may not trigger a reconfiguration failure procedure. When the UE fails in the NR RRC configuration, the UE may transmit the RRC message (e.g., an SCG failure information message, a UE assistance message, or a NR failure information/NR status message to be newly defined) including the cause of the NR RRC configuration failure to the NR base station (or LTE base station). Alternatively, when the UE (RRC) cannot comply with the NR configuration, the RRC may transmit the RRC message including the cause of the NR RRC configuration failure to the LTE base station. The LTE base station may transmit the RRC message to the NR base station.

Hereinafter, the above-mentioned procedure will be described in more detail.

When the received RRCConnectionReconfiguration message includes the configuration information for configuring NR radio resources, the UE (NR RRC) performs the NR configuration.

Alternatively, when the UE (NR RRC) cannot comply with the NR configuration, the UE continues to use the (NR) configuration that is used before receiving the RRC connection reconfiguration message (before the NR RRC receives the NR configuration information).

Alternatively, when the UE (NR RRC) cannot comply with the NR configuration, the use of the NR radio resource may be suspended/stopped/released. The NR radio resource may include at least one of a secondary cell group DRB, a secondary cell group SRB, a secondary cell group portion of a split DRB, and a secondary cell group portion of a split SRB.

Alternatively, when the UE (NR RRC) cannot comply with the NR configuration, the NR radio resource may be released.

Alternatively, when the UE (NR RRC) cannot comply with the NR configuration, the The NR RRC instructs the LTE RRC of a NR re-establishment failure. The LTE RRC transmits the RRC message including the cause of the NR RRC configuration failure to the LTE base station. The LTE base station transmits the RRC message to the NR base station.

Alternatively, when the UE (NR RRC) cannot comply with the NR configuration, the NR RRC directly transmits the RRC message including the cause of the NR RRC configuration failure to the NR base station via the interface between the UE and the NR base station.

Another example of the NR radio link failure will be described below.

When a radio link problem (failure) is detected on a NR physical layer, the UE may instruct the RRC entity of a NR physical layer failure. The RRC entity may instruct the LTE base station of the RRC message including the cause of the NR physical layer failure via the LTE SRB.

3. SRB Configuration Through NR Base Station and LTE Base Station

A NR may include different radio communication features from those of an LTE, and an LTE base station cannot understand an RRC message generated by a NR base station.

The NR base station may directly transmit, to a UE, a NR RRC message including one or more pieces of control information among NR cell/cell group/transmission point/transmission point group/transmission and reception point/transmission and reception point group/TRP/antenna/antenna group/beam addition/modification/release/management, NR measurement, NR measurement reporting, NR resource allocation, NR radio bearer addition/modification/release, NR radio resource configuration, and NR mobility control.

However, the NR may be constructed even at high frequencies (e.g., high frequencies about 6 GHz of higher). In this case, fast SINR drops may occur depending on the link blockage and high transmission loss in a high frequency band. In addition, when the NR RRC is transmitted, this may cause a problem. In order to overcome this problem, it is possible to transmit the NR RRC message using both an interface between the NR base station and the UE and an interface between the LTE base station and the UE.

Figure 5:
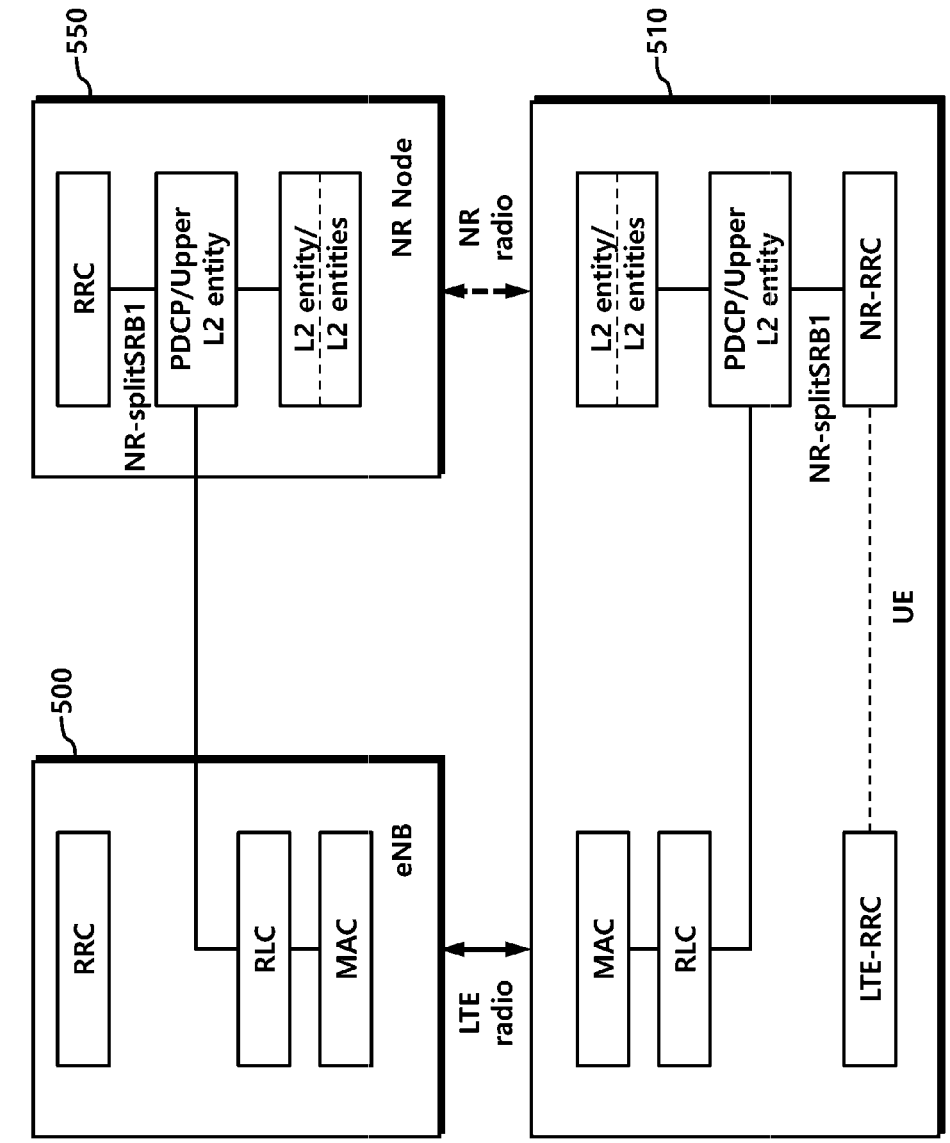
FIG. 5 is a diagram illustrating a dual connectivity SRB configuration according to another embodiment.

FIG. 5 is a diagram illustrating a dual connectivity SRB configuration according to another embodiment.

Referring to FIG. 5, for example, when LTE-NR dual connectivity is configured in a UE 510 (or when a NR additional radio resource is configured), a NR base station 550 may configure an SRB (for example, SRB1 type) capable of using both an LTE base station 500 and the NR base station 550 by the UE 510. Setting of the SRB (for convenience of description, a signaling radio bearer that configures the the NR base station to use both the LTE base station 500 and the NR base station 550 is referred to as NR-splitSRB1) capable of both the LTE base station 500 and the NR base station 550 may be configured through an RRC reconfiguration message (re)configurating the LTE-NR dual connectivity (configuring the NR additional radio resource).

When security is activated, integrity protection and ciphering should be performed with respect to all the RRC messages on the NR-splitSRB1 by PDCP (or L2 entity on NR). The LTE-NR dual connectivity may be considered to be applied to an RRC connected UE 510. Accordingly, integrity protection and ciphering should be performed with respect to all the RRC messages on the NR-splitSRB1 by the PDCP (or (upper) L2 entity on NR).

To this end, as to the NR-splitSRB1, security should be always activated from the start. The NR base station 550 should not set the corresponding bearer before activating security. The LTE base station 500 should not request addition of the NR base station 550 before activating security. Alternatively, the NR base station 550 should not request addition of the NR-splitSRB1 from the LTE base station 500 before activating security. The NR base station 550 may set the NR-splitSRB1 according to the NR base station addition request of the LTE base station 500. Alternatively, the NR base station 550 may set the NR-splitSRB1, as necessary.

For example, when the NR base station addition is requested, the LTE base station 500 transmits (or calculates and transmits) a NR base station key (e.g., NR-K) to the NR base station 500. The NR base station 550 selects an integrity protection algorithm and a ciphering algorithm. Next, the selected integrity protection algorithm and cipher algorithm (or identification information for the integrity protection algorithm and the cipher algorithm) for serving the NR-splitSRB1 to the UE 510 are transmitted to the UE through the LTE base station 500. The LTE base station 500 (or the NR base station 550) instructs the UE 510 of a counter (SCG counter or NR counter) for the UE 510 to calculate a key value associated with the NR-splitSRB1. The UE 510 calculates a NR base station key. The UE 510 calculates the key value (NR-$K_{RRCint}$ or NR-$K_{RRCenc}$) associated with the NR-SRB1. The UE 510 configures a lower layer (PDCP or L2 entity on NR) to apply the integrity protection algorithm, the ciphering algorithm, NR-$K_{RRCint}$, and NR-$K_{RRCerc}$.

For another example, the NR base station 550 may instruct the LTE base station 500 of information for configuring the NR-splitSRB1. As described above, the LTE base station 500 cannot understand NR RRC container/NR RRC IEs of the NR base station 550. Accordingly, the NR base station 550 may enable information for instructing the LTE base station 500 to configure the NR-splitSRB1 to be included in a signaling message on the interface between the NR base station 550 and LTE base station 500. When receiving the information for instructing the LTE base station 500 to configure the NR-splitSRB1, the LTE base station 500 may instruct the UE 510 of the information for configuring the NR-splitSRB1. The LTE base station 500 may instruct the UE 510 to process the NR-splitSRB1 in preference to a DRB. For example, a specific logical channel identification information (logicalchannelIdentity) value may be designated for the NR-splitSRB1. The UE 510 may process the logical channel designated as the NR-splitSRB1, in preference to the DRB. For another example, the same logical channel identification information (logicalchannelIdentity) value of 1 as that of the SRB1 may be designated for the NR-splitSRB1. For still another example, it is possible to instruct information for processing the NR-splitSRB1 with the same priority as the SRB1. For yet another example, it is possible to instruct information for instructing that the NR-splitSRB1 is a signaling bearer. For further another example, a different logical channel identification information (logicalchannelIdentity) value from that of the SRB1 may be designated, but the information for processing the NR-split SRB1 with the same priority as that of the SRB1 may be instructed. For example, the same logical channel configuration information as that of the SRB1 may be included. For further still another example, the same SRB identification information (SRB-identify) value (for example, 1) as that of the SRB1 may be designated for the NR-splitSRB1. For further yet another example, it is possible to designate the same/similar logical channel identification information (for example, priority (1 or 2), prioritisedBitRate(infinite)) as/to that of the SRB1 with respect to the NR-splitSRB1. For further another example, the UE includes the same logical channel identification information as that of the SRB1, but the UE may include information for identifying an entity for the NR-split SRB1.

For further another example, the UE may include logical channel identification information different from that of the SRB1, but may include the same logical channel configuration information as that of the SRB1.

4. SRB Configuration Through LTE Base Station and NR Base Station

A NR may include different radio communication features from those of an LTE, and an LTE base station cannot understand an RRC message generated by a NR base station.

The NR base station may directly transmit, to a UE, a NR RRC message including one or more pieces of control information among NR cell/cell group/transmission point/ transmission point group/transmission and reception point/ transmission and reception point group/TRP/antenna/antenna group/beam addition/modification/release/ management, NR measurement, NR measurement reporting, NR resource allocation, NR radio bearer addition/modification/release, NR radio resource configuration, and NR mobility control.

However, the NR may be constructed even at high frequency band (e.g., high frequencies of about 6 GHz or higher). In this case, fast SINR drops may occur depending on the link blockage and high transmission loss in a high frequency band. In addition, when the NR RRC is transmitted, this may cause a problem. In order to overcome this problem, it is possible to transmit the NR RRC message using both an interface between the NR base station and the UE and an interface between the LTE base station and the UE.

On the other hand, it may be desirable to first transmit some uplink or downlink RRC messages through the LTE base station for reliability.

Figure 6:
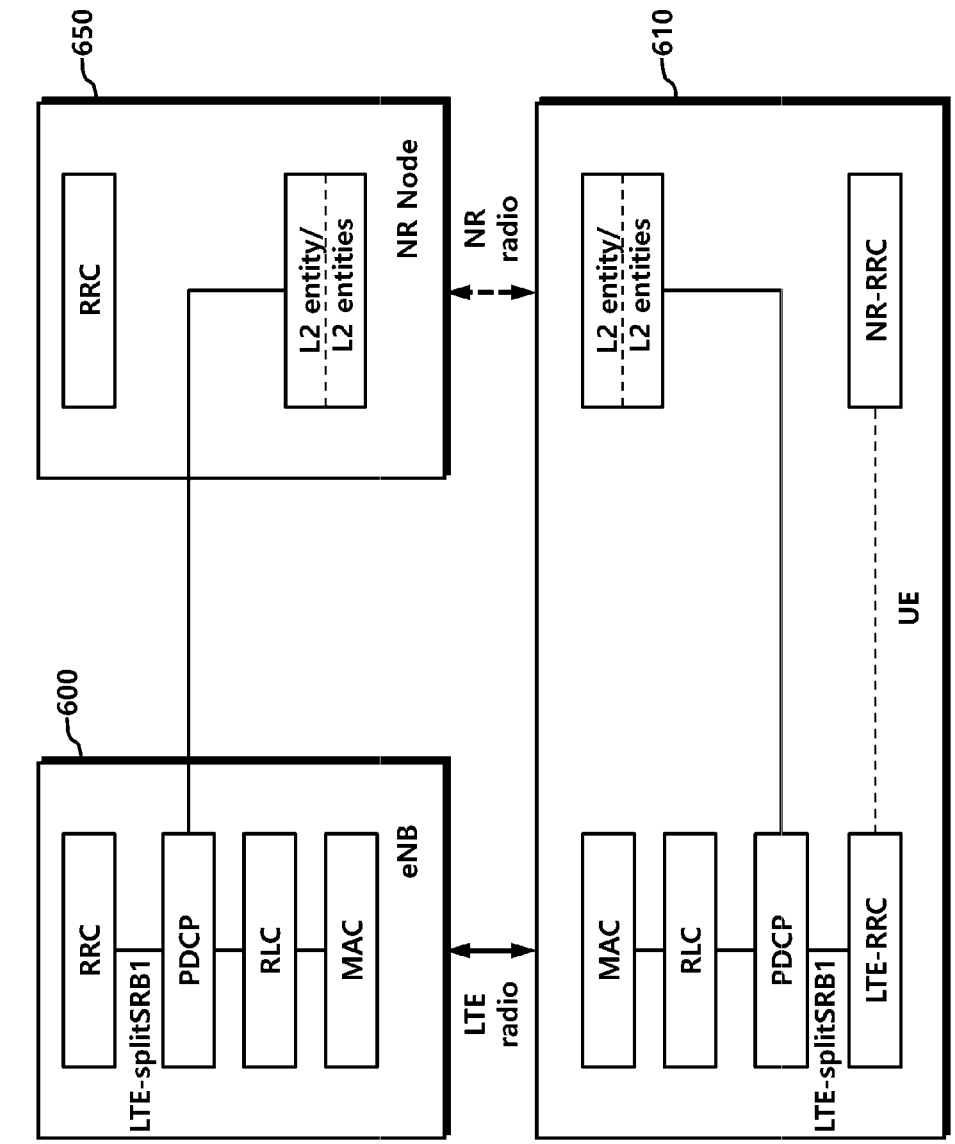
FIG. 6 is a diagram illustrating a dual connectivity SRB configuration according to still another embodiment.

FIG. 6 is a diagram illustrating a dual connectivity SRB configuration according to still another embodiment.

Referring to FIG. 6, for example, when LTE-NR dual connectivity is configured in a UE 610 (or when a NR additional radio resource is configured), an LTE base station 600 may configure an SRB (for example, SRB1 type) capable of using both the LTE base station 600 and a NR base station 650 by the UE 610. Setting of the SRB (for convenience of description, a signaling radio bearer that configures the the LTE base station to use both the LTE base station 600 and the NR base station 650 is referred to as LTE-splitSRB1) capable of both the LTE base station 600 and the NR base station 650 may be configured through an RRC reconfiguration message (re)reconfiguring the LTE-NR dual connectivity (configuring the NR additional radio resource).

Integrity protection and ciphering should be performed with respect to all the RRC messages on the LTE-splitSRB1 by PDCP.

To this end, as to the LTE-splitSRB1, security should be always activated from the start. The LTE base station 600 should not set the corresponding bearer before activating security. The LTE base station 600 should not request addition of the NR base station 650 before activating security. The NR base station 650 may set NR configuration for the LTE-splitSRB1 according to the instruction information included in the NR base station addition reqeust of the LTE base station 600.

For example, when the NR base station addition is requested, the LTE base station 600 transmits information for instructing the configuration of the LTE-splitSRB1 to the NR base station 650. The NR base station 650 transmits information (for example, one or more pieces of information of logaicalchannelconfig, logicalchannelIdentity, and rlcconfig) for configuring a NR part of the LTE-splitSRB1 to the UE 610 through the LTE base station 600. For another example, the NR base station 650 may instruct the LTE base station 600 of information for confirming the configuration of the LTE-splitSRB1. As described above, the LTE base station 600 may not understand NR RRC container/NR RRC IEs of the NR base station 650. Therefore, the NR base station 650 may enable instruction information for confirming the configuration of the LTE-splitSRB1 in the LTE base station 600 to be included in a signaling message on the interface between the NR base station 650 and the LTE base station 600. When receiving information for instructing the LTE base station 600 to configure the LTE-splitSRB1, the LTE base station 600 may instruct the UE 610 of the information for configuring an LTE part of the LTE-splitSRB1. The LTE base station 600 may process the LTE-splitSRB1 in preference to a DRB. For example, a specific logical channel identification information (logicalchannelIdentity) value may be designated for the LTE-splitSRB1. The UE 610 may process the logical channel designated as the LTE-splitSRB1, in preference to the DRB. For another example, the same logical channel identification information (logicalchannelIdentity) value of 1 as that of the SRB1 may be designated for the NR-splitSRB1 (or configured as SRB1 or SRB2).

The NR base station 650 may process the LTE-splitSRB1 in preference to the DRB. For example, a specific logical channel identification information (logicalchannelIdentity) value may be designated for the LTE-splitSRB1. The UE 610 may process the logical channel designated as the LTE-splitSRB1, in preference to the DRB. For another example, the same logical channel identification information (logicalchannelIdentity) value of 1 as that of the SRB1 may be designated for the LTE-splitSRB1 (or configured as SRB1 or SRB2). For further another example, it is possible to instruct information for processing the LTE-splitSRB1 with the same priority as the SRB1. For further still another example, it is possible to instruct information for instructing that the LTE-splitSRB1 is a signaling bearer. For further yet another example, the same SRB identification information (SRB-identity) value (for example, 1) may be designated for the LTE-splitSRB1. For still another example, it is possible to designate the same/similar logical channel configuration value (for example, priority (1 or 2), prioritisedBitRate (infinite)) as/to that of the SRB1 with respect to the LTE-splitSRB1. For yet another example, since LTE-splitSRB1 may be processed in the same manner as that in the SRB1, a separate configuration may not be provided. For further another example, the UE may include the same logical channel identification information as that of the SRB1, but may include information for identifying an entity for the LTE-splitSRB1.

For further another example, the UE may include logical channel identification information different from that of the SRB1, but may include the same logical channel configuration information as that of the SRB1.

However, the LTE base station 600 may instruct the UE of information for designating a path of an RRC signaling message as the LTE base station 600 and the NR base station 650 (or the LTE base station 600 and the NR base station 650, and two base stations) in the PDCP entity.

Meanwhile, hereinafter, when the UE receives a different RRC message, a method of processing this will be described in detail.

Through the above-described embodiments, an LTE radio resource control entity of the LTE base station and a NR radio resource entity of the NR base station may independently instruct corresponding base station radio resource control configuration. Alternatively, through the above-described embodiments, the LTE radio resource control entity of the LTE base station, and the NR radio resource entity of the NR base station may independently instruct the corresponding base station radio resource control configuration within a range not exceeding UE capability. Alternatively, through the embodiments described above, the LTE radio resource control entity of the LTE base station and the NR radio resource entity of the NR base station may instruct the corresponding base station radio resource control configuration through coordination. Alternatively, through the above-described embodiments, the LTE radio resource control entity of the LTE base station may instruct the LTE base station radio resource control configuration through an LTE radio link and a NR radio link. Alternatively, through the above-described embodiments, the NR radio resource control entity of the NR base station may instruct the LTE base station radio resource control configuration through the NR radio link and the LTE radio link.

The LTE base station may instruct the UE of an RRC message instructing the NR base station radio resource configuration (associated with the NR base station radio resource configuration or affecting the the NR base station radio resource configuration). For example, the LTE base station may transmit, to the UE, an RRC message including information instructing NR base station radio resource (NR-configuration) release.

For example, when the UE is set to release the NR base station radio resource in the RRC message received from the LTE base station, the UE releases the entire NR base station radio resource except for a DRB configuration. When the current UE configuration includes one or more split or SCG DRBs and the received RRC reconfiguration message includes radio resource configuration dedicated information including DRB information (drb-ToAddModList) to be further modified, split or SCG DRB may be reconfigured according to the DRB information to be further modified.

For another example, when the UE is set to release the NR base station radio resource in the RRC message received from the LTE base station, the UE releases the entire NR base station radio resource.

When the LTE base station instructs the UE of the RRC message instructing the NR base station radio resource configuration (associated with the NR base station radio resource configuration or affecting the the NR base station radio resource configuration), the NR base station may instruct the UE of the RRC message instructing NR base station radio resource configuration.

For example, the NR base station may instruct the UE of the RRC message one or more NR radio resource configurations among NR cell addition (modification, release, or management), NR measurement, NR measurement reporting, NR resource allocation, NR radio bearer addition/modification/release, NR radio resource configuration, and NR mobility control.

For example, the UE may receive another RRC message before receiving one RRC message and completing application of the received RRC message.

1. A Case of Receiving NR Radio Resource Release from LTE Base Station

In a case in which a UE configures a NR base station radio resource according to the RRC message received from the NR base station, when receiving an RRC message including information instructing NR base station radio resource (NR-configuration) release from the LTE base station, the UE may perform one or more operations of the following operations.

The UE may perform NR base station radio resource release.

When receiving the NR base station radio resource release from the LTE base station, the UE may revert the current operation of the RRC message to the configuration used before receiving the RRC message that is suspended/stopped/cancelled/held/dropped/paused/overrode, and may perform the NR base station radio resource release.

The UE may receive the NR base station radio resource release from the LTE base station, and the UE may transmit, to the NR base station, the RRC message including information instructing the occurrence of reverting the current operation of the RRC message to the configuration used before receiving the RRC message that is suspended/stopped/cancelled/held/dropped/paused/overrode.

The NR base station radio resource may be configured sequentially in order of the RRC messages received in the UE. Accordingly, the UE may receive the first received RRC message, may complete an operation for configuring the RRC message, and may perform the NR base station radio resource release.

When the NR base station radio resource is set to be released in the RRC message received from the LTE base station, the UE releases the entire NR base station radio resource except for the DRB configuration.

When the current UE configuration includes one or more split or SCG DRBs and the received RRC reconfiguration message includes radio resource configuration dedicated information including DRB information (drb-ToAddModList) to be further modified, split or SCG DRB may be reconfigured according to the DRB information to be further modified.

The base station (LTE base station or NR base station) may instruct the UE of information for instructing the above-described operation, and the base station may configure the corresponding information.

2. A Case of Receiving NR Radio Resource Release from NR Base Station

In a case in which a UE configures a NR base station radio resource according to the RRC message received from the LTE base station, when receiving an RRC message including information instructing NR base station radio resource (NR-configuration) release from the NR base station, the UE may perform one or more operations of the following operations.

The UE may perform NR base station radio resource release.

When receiving the NR base station radio resource release from the NR base station, the UE may revert the current operation of the RRC message to the configuration used before receiving the RRC message that is suspended/stopped/cancelled/held/dropped/paused/overrode, and may perform the NR base station radio resource release.

The UE may receive the NR base station radio resource release from the NR base station, and the UE may transmit, to the LTE base station, the RRC message including information instructing the occurrence of reverting the current operation of the RRC message to the configuration used before receiving the RRC message that is suspended/stopped/cancelled/held/dropped/paused/overrode.

The NR base station radio resource may be configured sequentially in order of the RRC messages received in the UE. Accordingly, the UE may receive the first received RRC message, may complete an operation for configuring the RRC message, and may perform the NR base station radio resource release.

When the NR base station radio resource is set to be released in the RRC message received from the NR base station, the UE releases the entire NR base station radio resource except for the DRB configuration.

When the current UE configuration includes one or more split or SCG DRBs and the received RRC reconfiguration message includes radio resource configuration dedicated information including DRB information (drb-ToAddModList) to be further modified, split or SCG DRB may be reconfigured according to the DRB information to be further modified.

The base station (LTE base station or NR base station) may instruct the UE of information for instructing the above-described operation, and may configure the corresponding information.

3. A Case of Receiving Different RRC Messages Except for Releasing NR Radio Resource In a case in which a UE configures a NR base station radio resource according to the RRC message received from the LTE base station, when receiving an RRC message including information instructing NR base station radio resource (NR-configuration) addition/modification/configuration from the NR base station, the UE may perform one or more of the following operations (Alternatively, in a case in which a UE configures a NR base station radio resource according to the RRC message received from the NR base station, when receiving an RRC message including information instructing NR base station radio resource (NR-configuration) addition/modification/configuration from the LTE base station, the UE may perform one or more operations of the following operations).

The NR base station radio resource may be configured sequentially in order of the RRC messages received in the UE. Accordingly, the UE may receive the first received RRC message, may complete an operation for configuring the RRC message, and may perform the NR base station radio resource configuration acording to the RRC message received thereafter.

The RRC message received from a MeNB (e.g., LTE base station) may be preferentially processed. The UE may transmit, to a SeNB (e.g., NR base station), an RRC message including information instructing the occurrence of reverting the RRC configuration instruction to the configuration used before receiving the RRC message that is suspended/stopped/cancelled/held/dropped/paused/overrode.

The RRC message received from the NR base station may be preferentially processed. The UE may transmit, to the NR base station, an RRC message including information instructing the occurrence of reverting the RRC configuration instruction by the LTE base station to the configuration used before receiving the RRC message that is suspended/stopped/cancelled/held/dropped/paused/overrode.

The base station (LTE base station or NR base station) may instruct information for instructing the UE of the above-described operation and may configure the information.

As described in the present specification, the present disclosure provides an effect of minimizing unnecessary waste of radio resources and data processing time when the UE performs redundant data transmission via a plurality of different radio paths. Further, the present disclosure has an effect in which the UE may efficiently perform the redundant transmission via two different radio paths. It is possible to effectively process radio resource control signaling of the NR base station for the LTE-NR dual connectivity operation that supports tight interworking between LTE and NR. In addition, there is an effect that the base station may discriminate RRC messages using two different radio access links.

Hereinafter, a UE and an base station that may perform a part or all of the embodiments described with reference to FIGS. 1 to 6 will be described with reference to FIGS. 7 and 8.

Figure 7:
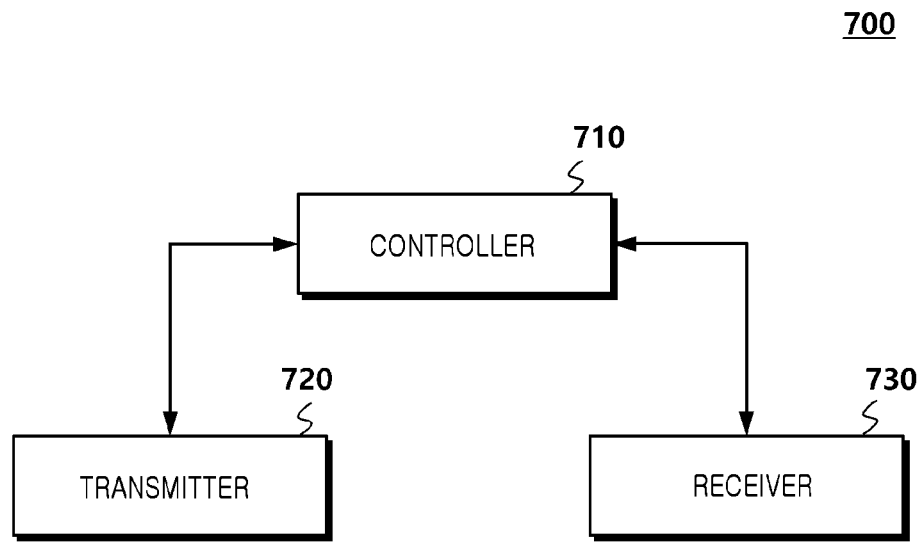
FIG. 7 is a block diagram illustrating a UE according to an embodiment.

FIG. 7 is a block diagram illustrating a UE according to an embodiment.

Referring to FIG. 7, a UE 700 in which dual connectivity redundantly transmitting data is configured may include a receiver 730, a controller 710, and a transmitter 730. The receiver 730 may receive, from an base station, an RRC message including configuration information for configuring redundant transmission in a PDCP entity and receive instruction information instructing whether a redundant transmission operation of the PDCP entity configured from the base station is activated or deactivated. The controller 710 may configure the redundant transmission of the PDCP entity for one or more radio bearers. The transmitter 720 may copy, when the instruction information instructs activation, a PDCP PDU in the PDCP entity and transmit the copied PDCP PDU to different RLC entities to redundantly transmit the same data to a plurality of base stations.

The controller 710 may configure a dual connection (dual connectivity) with the plurality of base stations. The plurality of base stations may be set to use different radio access technologies. For example, a MeNB may be a gNB using the above-described NR radio access technology, and a SeNB may be an base station using the LTE radio access technology. Alternatively, the MeNB may be an base station using the LTE radio access technology, and the SeNB may be a gNB using the NR radio access technology. Alternatively, both the MeNB and the SeNB may be gNBs using the NR radio access technology.

In addition, the controller 710 may configure the PDCP entity to transmit data having the same PDCP SN via the plurality of paths based on the configuration information. The controller 710 may configure redundant transmission in the PDCP entity, and configures the redundant transmission to be deactivated. Alternatively, the controller 710 may configure the redundant transmission function in the PDCP entity to be activated.

Meanwhile, the configuration information received by the receiver 730 may include specific information for supporting the redundant transmission function in the PDCP entity. For example, the configuration information includes information for configuring the UE so that at least one operation of i) a processing operation when redundant data is received from the PDCP entity, ii) a processing operation when information about whether the redundant transmission function is activated or deactivated is received, and iii) an operation in which the PDCP entity transmits data having the same PDCP SN via two paths can be performed.

In addition, the receiver 730 may receive the instruction information through an MAC CE. The instruction information may include information instructing whether the redundant transmission function of the PDCP entity configured in the UE is changed to be activated or deactivated. When the instruction information instructs the activation, an MAC entity of the UE may instruct an upper layer to activate the redundancy transmission operation of the PDCP entity. That is, when the instruction information received through the MAC CE instructs the activation of the redundant transmission function, the MAC entity of the UE may transmit this to the upper layer (for example, RRC layer) and may instruct the upper layer.

When the instruction information instructs activation, the transmitter 820 may transmit the PDCP PDU copied in the PDCP entity to the different RLC entities, thereby redundantly transmitting the same data to the plurality of base stations.

For example, when the redundant transmission function of the PDCP entity configured in the UE is configured (or changed) to be activated by the above-described instruction information, the PDCP entity copies data to be transmitted to the base station and transmits the copied data to the plurality of RLC entities connected to the PDCP entity, so that the transmitter 820 may transmit the same data to the base station through the plurality of radio paths.

Meanwhile, the plurality of RLC entities may be configured in the UE for each base station configuring dual connectivity, and the plurality of RLC entities may be associated with one PDCP entity. When the instruction information instructs deactivation and the redundant transmission operation of the PDCP entity is configured in the UE, the PDCP entity may transmit the PDCP PDU to any one of the plurality of RLC entities. That is, when the redundant transmission function in the PDCP entity is configured in the UE but the corresponding function is deactivated, the PDCP entity may transmit data only to one RLC entity of the plurality of RLC entities configured for dual connectivity, and the transmitter 820 may perform data transmission via a single path.

Meanwhile, the above-described redundant transmission function may be configured only for a DRB. For example, the redundant transmission function in the PDCP entity may not be configured for a signaling radio bearer, but may be configured only for the DRB.

In addition, the instruction information may instruct each of one or more DRBs to activate or deactivate the redundant transmission operation of the PDCP entity. For example, the instruction information may include information on whether the redundant transmission function of the PDCP entity is activated or deactivated for each DRB configured in the UE. In this case, the PDCP redundant transmission function may be instructed to be activated for the specific DRB, but may be instructed to be deactivated for another DRB. The above-described base station may be a MeNB or a SeNB.

In addition, the controller 710 may configure dual connectivity with the plurality of base stations when performing the above-described embodiments and control the ovarall operations of the UE 700 when redundantly transmitting data to the base station. In addition, the receiver 730 may receive downlink control information, data, and messages from the base station through a corresponding channel, and the transmitter 720 may transmit uplink control information, data, and messages to the base station through the corresponding channel.

Figure 8:
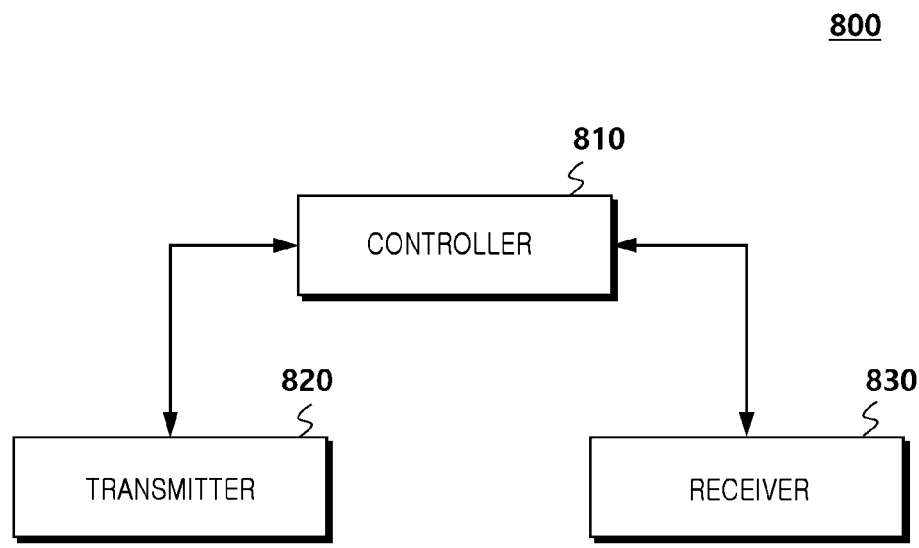
FIG. 8 is a block diagram illustrating an base station according to an embodiment.

FIG. 8 is a diagram illustrating an base station according to an embodiment.

Referring to FIG. 8, an base station 800 that configures dual connectivity with a UE and redundantly receiving data may include a transmitter 820, a receiver 830, and a controller 810. The transmitter may transmit, to a UE, an RRC message including configuration information for configuring redundant transmission in a PDCP entity of the UE for one or more radio bearers and transmit instruction information instructing whether a redundant transmission operation of the configured PDCP entity is activated or deactivated. The receiver 830 may redundantly receive, when the instruction information instructs activation, data copied in the PDCP entity of the UE and transmitted, through an RLC entity of the base station and an RLC entity of another base station configuring dual connectivity for the UE.

As described above, the controller 810 may configure dual connectivity in the UE together with other base stations. In addition, the base stations configuring the dual connectivity may be configured to use different radio access technologies.

The transmitter 820 may transmit, to the UE, an RRC message including configuration information for configuring redundant transmission in the PDCP entity of the UE for one or more radio bearers. For example, the configuration information may include specific information for supporting the redundant transmission function in the PDCP entity. For example, the configuration information includes information for configuring the UE so that at least one operation of i) a processing operation when redundant data is received from the PDCP entity, ii) a processing operation when information about whether the redundant transmission function is activated or deactivated is received, and iii) an operation in which the PDCP entity transmits data having the same PDCP SN via two paths can be performed.

In addition, in operation S320, the transmitter 820 may perform an operation of transmitting the instruction information instructing whether the redundant transmission of the configured PDCP entity is activated or deactivated. For example, the instruction information may be transmitted through an MAC CE. The instruction information may include information instructing whether the redundant transmission function of the PDCP entity configured in the UE is changed to be activated or deactivated.

When the instruction information instructs the activation, the receiver 830 may redundantly receive data copied in the PDCP entity of the UE and transmitted, through an RLC entity of the base station and an RLC entity of another base station configuring dual connectivity for the UE. In this case, the UE copies a PDCP PDU from the PDCP entity of the UE and transmits the PDCP PDU to different RLC entities configured in the UE, so that the base station 800 receives the same data through a plurality of RLC entities. The plurality of RLC entities may be configured in the UE for each base station configuring the dual connectivity, and the plurality of RLC entities may be associated with one PDCP entity. Similarly, the PDCP entity of the base station 800 may be associated with the RLC entity of the corresponding base station 800 and may also be associated with the RLC entity of another base station configuring the dual connectivity. Specifically, the receiver 830 receives data through the radio resource between the base station and the UE and receives the same data from other base stations through an interface between the base stations. Alternatively, when the instruction information instructs deactivation and the PDCP entity is configured for the redundant transmission operation, the receiver 830 may receive data only through the RLC entity of the base station.

Meanwhile, the above-described redundant transmission function may be configured only for the DRB. For example, the redundant transmission function in the PDCP entity may not be configured for the signaling radio bearer, but may be configured only for the DRB.

In addition, the instruction information may instruct each of one or more DRBs to activate or deactivate the redundant transmission operation of the PDCP entity. For example, the instruction information may include information on whether the redundant transmission function of the PDCP entity is activated or deactivated for each DRB configured in the UE. In this case, the PDCP redundant transmission function may be instructed to be activated for the specific DRB, but may be instructed to be deactivated for another DRB.

In addition, the controller 810 may configure dual connectivity with the plurality of base stations in the UE when performing the above-described embodiments, control the redundant transmission of uplink data of the UE, and control the ovarall operations of the base station 800 when the redundantly transmitted data is received. In addition, the transmitter 820 and the receiver 830 may be used to transmit and receive signals, messages, and data necessary for performing the above-described embodiments to and from the UE and the SeNB.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or to distributed between two or more computers.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

What is claimed is:

1. A method for redundantly transmitting data by a user equipment (UE) that configures dual connectivity, the method comprising:
    receiving, from an base station, a radio resource control (RRC) message including configuration information for configuring redundant transmission in a packet data convergence protocol (PDCP) entity;
    configuring the redundant transmission in the PDCP entity for one or more radio bearers;
    receiving, from the base station, instruction information for instructing whether a redundant transmission operation of the configured PDCP entity is activated; and
    copying, when the instruction information instructs activation, a PDCP protocol data unit (PDU) in the PDCP entity and transmitting the copied PDCP PDU to different radio link control (RLC) entities to redundantly transmit the same data to a plurality of base stations.

2. The method of claim 1, wherein the UE is configured to transmit data to and receive data from the plurality of base stations each configured to use a radio access technology different from the other.

3. The method of claim 1, wherein the instruction information is received through a MAC control element (MAC CE).

4. The method of claim 1, wherein the receiving the instruction information further includes instructing, by a MAC entity, an upper layer to activate the redundant transmission operation of the PDCP entity when the instruction information instructs activation.

5. The method of claim 1, wherein, when the instruction information instructs deactivation and the redundant transmission operation of the PDCP entity is configured, the PDCP entity transmits the PDCP PDU to at least one of the plurality of RLC entities.

6. The method of claim 1, wherein the one or more radio bearers is a data radio bearer (DRB), and the instruction information instructs each of the one or more DRBs to activate or deactivate the redundant transmission operation of the PDCP entity.

7. A method for redundantly receiving by an base station configuring dual connectivity with a user equipment (UE), the method comprising:
    transmitting, to the UE, an radio resource control (RRC) message including configuration information for configuring redundant transmission in a packet data convergence protocol (PDCP) entity of the UE for one or more radio bearers;
    transmitting instruction information for instructing whether a redundant transmission operation of the configured PDCP entity is activated; and
    redundantly receiving data copied in the PDCP entity of the UE and transmitted, through an RLC entity of the base station and an RLC entity of another base station configuring dual connectivity for the UE, when the instruction information instructs activation.

8. The method of claim 7, wherein the other base station is set to use a radio access technology different from that of the base station, and the dual connectivity is configured with respect to the UE together with the base station.

9. The method of claim 7, wherein the instruction information is transmitted through a MAC CE.

10. The method of claim 7, wherein, when the instruction information instructs deactivation and the redundant transmission operation of the PDCP entity is configured in the UE, the PDCP entity of the base station receives data only through the RLC entity of the base station.

11. The method of claim 7, wherein the one or more radio bearers is a DRB, and the instruction information instructs each of the one or more DRBs to activate or deactivate the redundant transmission operation of the PDCP entity.

12. A User Equipment (UE) of redundantly transmitting data for dual connectivity the UE comprising:
   a receiver configured to receive, from an base station, an remote resource control (RRC) message including configuration information for configuring redundant transmission in a packet data convergence protocol (PDCP) entity and to receive instruction information for instructing whether a redundant transmission operation of the PDCP entity configured from the base station is activated or deactivated;
   a controller configured to configure the redundant transmission of the PDCP entity for one or more radio bearers; and
   a transmitter configured to copy, when the instruction information instructs activation, a PDCP PDU in the PDCP entity and transmit the copied PDCP PDU to different RLC entities to redundantly transmit the same data to a plurality of base stations.

13. The UE of claim 12, wherein the UE is configured to transmit and receive data to and from the plurality of base stations configured to each use an radio access technology different from the other.

14. The UE of claim 12, wherein the instruction information is received through a MAC CE.

15. The UE of claim 12, wherein the controller controls a MAC entity to instruct an upper layer to activate the redundant transmission operation of the PDCP entity, when the instruction information instructs activation.

16. The UE of claim 12, wherein, when the instruction information instructs deactivation and the redundant transmission operation of the PDCP entity is configured, the PDCP entity transmits the PDCP PDU to at least one of the plurality of RLC entities.

17. The UE of claim 12, wherein the one or more radio bearers is a DRB, and the instruction information instructs each of the one or more DRBs to activate or deactivate the redundant transmission operation of the PDCP entity.

* * * * *